United States Patent [19]
Yoshida

[11] Patent Number: 4,884,104
[45] Date of Patent: Nov. 28, 1989

[54] IMAGE FORMING APPARATUS HAVING MULTIPLE IMAGE INFORMATION INPUTS

[75] Inventor: Tadashi Yoshida, Tokyo, Japan

[73] Assignee: Canon Kabushiki Kaisha, Tokyo, Japan

[21] Appl. No.: 213,452

[22] Filed: Jun. 29, 1988

Related U.S. Application Data

[63] Continuation of Ser. No. 928,697, Nov. 7, 1986, abandoned, which is a continuation of Ser. No. 849,421, Nov. 7, 1983, abandoned.

[30] Foreign Application Priority Data

Nov. 10, 1982 [JP] Japan ................. 57-196911

[51] Int. Cl.⁴ ............................ G03G 15/00
[52] U.S. Cl. ....................... 355/202; 355/210
[58] Field of Search ............. 355/3 R, 3 TF, 3 SC, 355/7, 14 R, 14 C, 202, 210

[56] References Cited

U.S. PATENT DOCUMENTS

| | | | |
|---|---|---|---|
| 4,124,286 | 11/1978 | Barasch | 355/3 R |
| 4,213,694 | 7/1980 | Kuseski | 355/14 C X |
| 4,268,164 | 5/1981 | Yajima et al. | 355/7 X |
| 4,291,341 | 9/1981 | Yajima | 355/14 R X |
| 4,309,101 | 1/1982 | Nakamura et al. | 355/3 R X |
| 4,373,799 | 2/1983 | Snelling et al. | 355/3 R |
| 4,442,190 | 4/1984 | Kitajima et al. | 355/3 SC X |
| 4,446,472 | 5/1984 | Kato et al. | 355/3 R X |

FOREIGN PATENT DOCUMENTS

| | | | |
|---|---|---|---|
| 56-55962 | 5/1981 | Japan | 355/77 |
| 0159655 | 12/1981 | Japan | 355/14 CU |

Primary Examiner—Arthur T. Grimley
Assistant Examiner—J. Pendegrass
Attorney, Agent, or Firm—Fitzpatrick, Cella, Harper & Scinto

[57] ABSTRACT

An image forming apparatus has a first image forming unit for image reproduction from an original image and a second image forming unit for image reproduction from image signals for achieving easier interruption imaging and complicated image processing. Four modes are selectable, a normal mode, an analog mode, a digital mode and an overlay mode. An image forming apparatus is provided wherein an original image is converted into an electrostatic charge which is maintained. A first electrostatic latent image is formed on a recording medium according to the maintained charge. A second electrostatic latent image is formed on the recording medium according to an input image signal. In response to a demand for the second latent image, formation of the first latent image is interrupted and restarted after formation of the second latent image.

26 Claims, 21 Drawing Sheets

FIG. 15
(a)
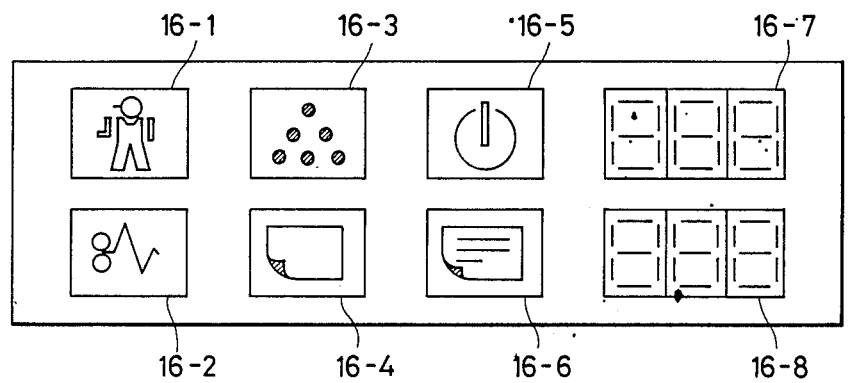
(b)
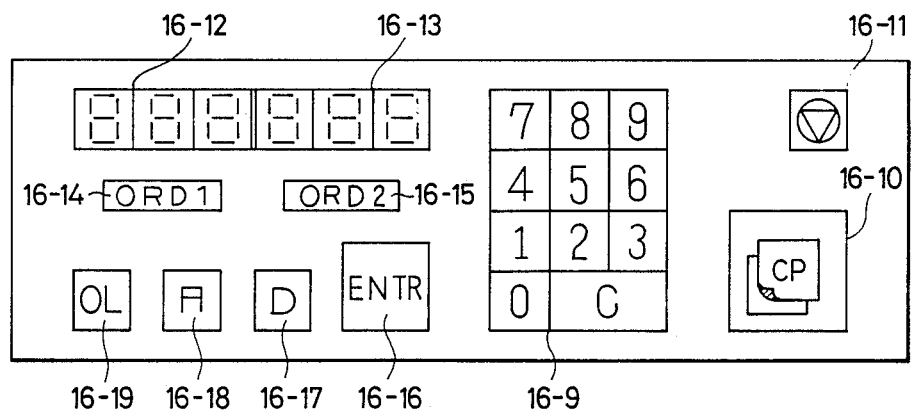

(a)

(b)

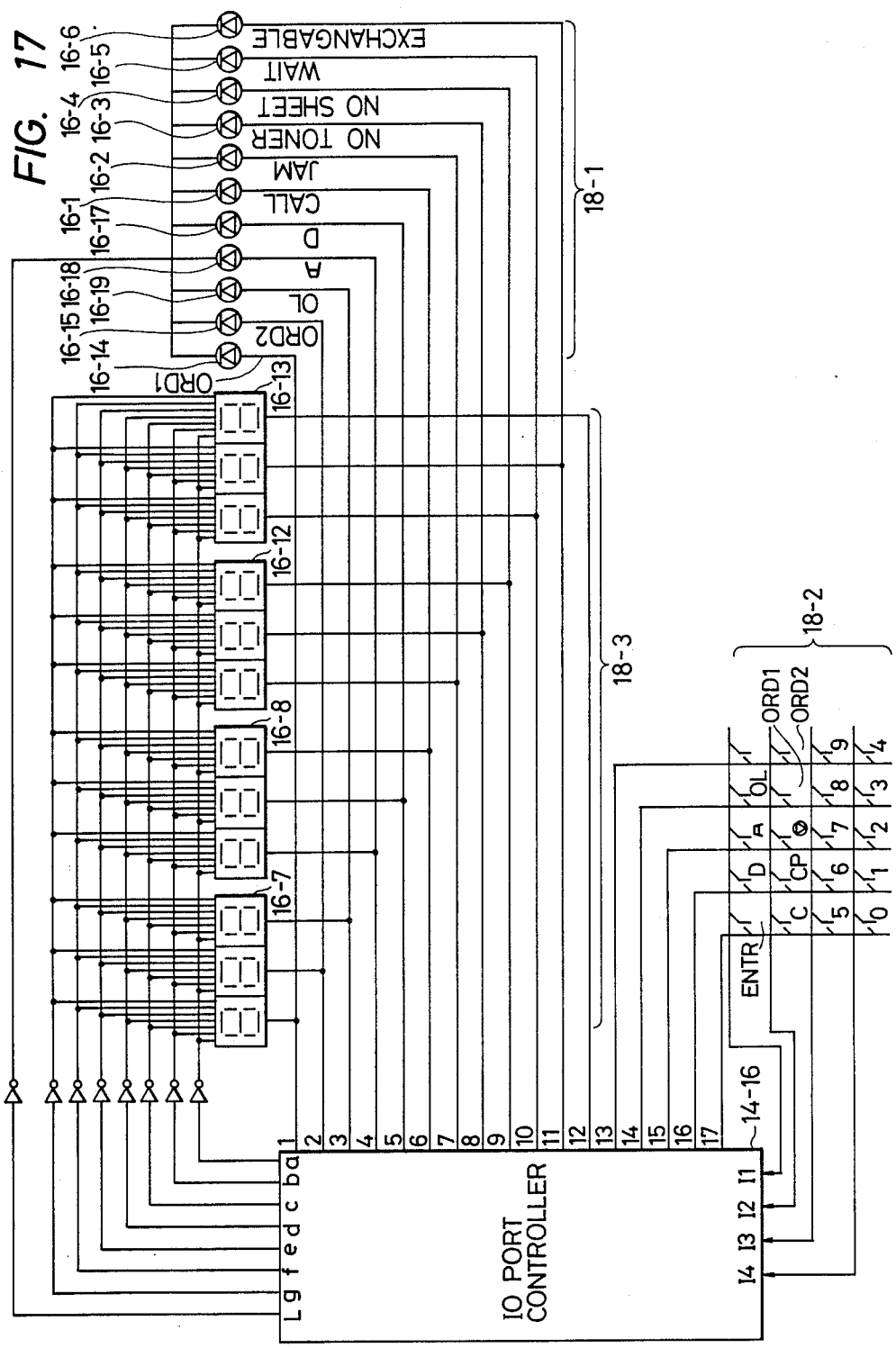

FIG. 21A
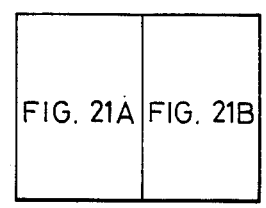
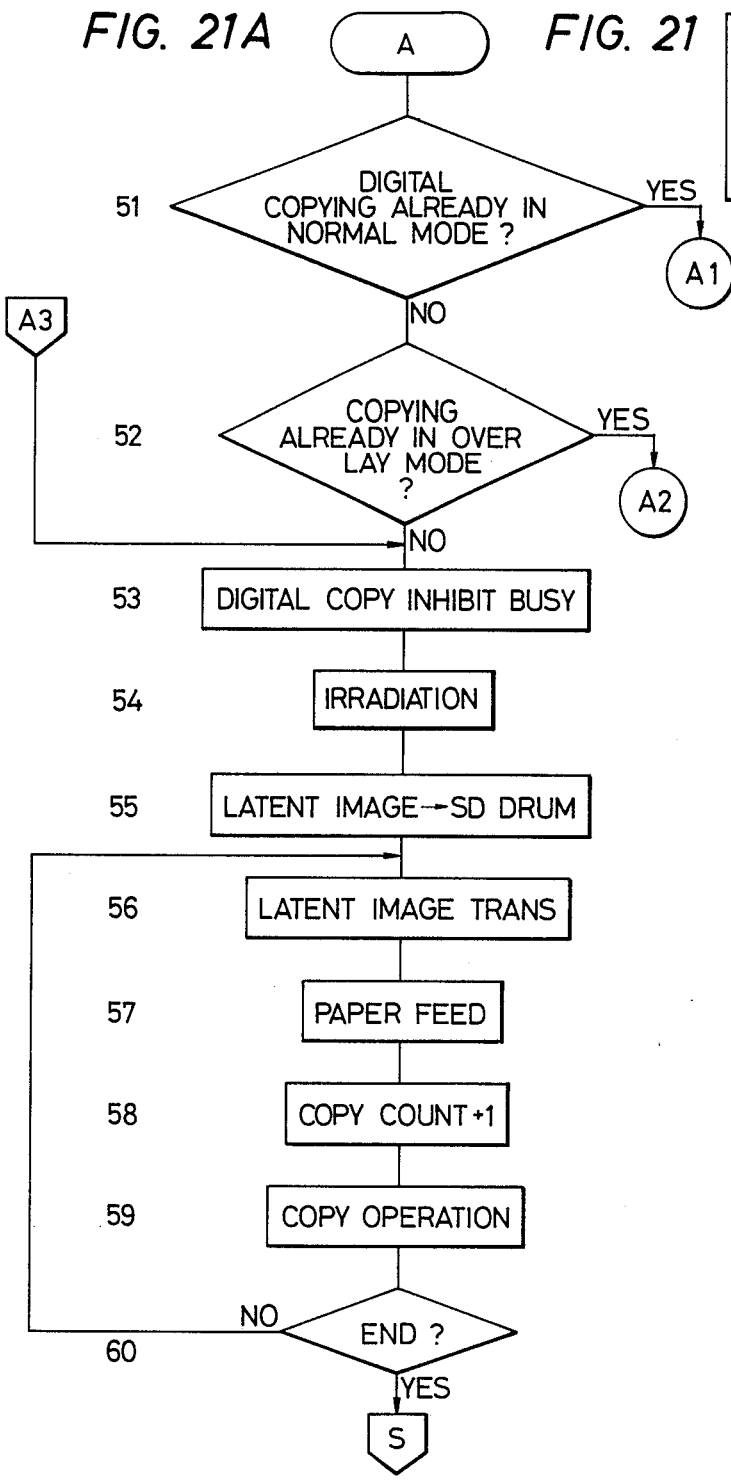

IMAGE FORMING APPARATUS HAVING MULTIPLE IMAGE INFORMATION INPUTS

This application is a continuation of application Ser. No. 928,697 filed 11/7/86, now abandoned which is a continuatin of Ser. No. 549,421, filed Nov. 7, 1983, now abandoned.

BACKGROUND OF THE INVENTION

1. Field of the Invention

The present invention relates to an image forming apparatus for image formation such as image recording in response to an original image or to image information entered from an exterior apparatus.

2. Description of the Prior Art

In conventional apparatus capable of image recording according to different image sources, the recording condition or the recording operation is controlled in different manners according to the image source to be recorded. Also, when an image recording is requested from another source during the image recording operation by scanning an original and such other image recording is given priority, the original scanning is repeated afterwards to complete the image recording operation. During the image recording operation of an image supplied from an outside apparatus, the image recording by original scanning cannot be conducted and access to the apparatus is prohibited until the completion of the recording operation under way.

Also, in a case of synthesized recording, for example, of an original image and data recorded on a magnetic tape or the like, there have been required various signal exchanges and detailed control procedures for recording line registration and signal synchronization.

Also, in an apparatus having such synthesized recording mode, once the recording operation in the synthesized recording mode is commenced, a recording operation without such synthesis can only be initiated by interrupting the recording in the synthesis mode and selecting anew a desired recording mode.

Furthermore, there is already known a local area network for image recording through image transmission among stations equipped with image reading devices and image recording devices. In such a network, the image reading device and the image recording device in each station may be directly connected for achieving a local copying mode for making a copy in the same manner as in the conventional copier.

In such a system, the priority of the recording operation for the transmitted image and of the local copying is determined by the state of utilization and the condition of installation of each station. Such priority is important in relation to the process for a demand for interruption during a recording operation.

Furthermore, in such apparatus, there is proposed, in case of a demand for recording another image during the image recording operation for transmitted information, to permit the demand according to the necessity. In such recording mode, however, the preceding recording mode may be forgotten, for example, if the interruption is extended in time.

Furthermore, the case when an erroneous stop instruction is given to an apparatus capable of accepting a demand for interruption, it is preferable that the mode before stop can be immediately restored for achieving smooth information processing. Furthermore, in such apparatus, the function is usually completely stopped in response to an abnormal situation, so that certain procedures are needed in order to restart the recording operation.

Furthermore, in such an image forming apparatus, signal exchange is conducted, for example, for each line in order to synchronize the image recording device with the image information generating device, so that the latter is required to have a program exclusive for a printing operation, an interface, etc. Also in case of information recording with a size modification, there are required a data processing circuit and a complicated program for such image size modification. Such circuit and software are required also for image trimming.

Furthermore, in the conventional copier, copying of a desired image only of an original is achieved by suitable work on the original, such as cutting out the desired image area or covering the unnecessary area. Such work is however tedious, and may smear or destroy the original.

Furthermore, in a case of recording image information supplied from an outside device on a recording sheet, a permission signal for sheet feeding is given to the outside device according to the working state of the recording device, and, in response to the signal, the outside device dtermines the timing of sheet feeding for each sheet feeding. Consequently the signal exchange for sheet feeding has to be conducted between the recording device and the outside device, thus requiring a complicated control procedure.

Furthermore, in a case of synthesizing plural information for recording, the number of recordings of such synthesized information is to be determined by a predetermined information source, and the information output of plural information sources is controlled according to the thus determined number. Consequently, a device lacking the ability to determine the number may not be able to obtain the recordings of the determined number. Also inconvenience may arise if the desired number differs between the information sources.

Furthermore, in a recording apparatus for recording information supplied from an outside device, the recording operation is controlled by control signals, such as a sheet feeding signal, supplied from the outside device. The quantity of information, namely the number of recordings, supplied form the outside device cannot be known at the recording device.

When the outside device is a computer or the like, the quantity of recordings tends to become very large, thus requiring a display device of a large number of digits, giving rise to an increased manufacturing cost and an increased space for installation.

Furthermore, in an apparatus capable of a local copying mode for copying an image supplied from an image output device combined with the recording device, the operator is unable to know the quantity of interruption recordings requested from an outside device.

SUMMARY OF THE INVENTION

In consideration of the foregoing, an object of the present invention is to provide an image forming apparatus capable of adequately responding to various demands for image recording through a simple structure and a simple control.

Another object of the present invention is to provide an image forming apparatus capable of both image recording by scanning an original and recording of an image supplied from an external device, without the aforementioned drawbacks in operation.

Still another object of the present invention is to provide an image forming apparatus capable of easily achieving image synthesis and image trimming.

Still another object of the present invention is to provide an image forming apparatus capable of cancellation or restoration of the image synthesis mode without interruption of the recording operation currently under way.

Still another object of the present invention is to provide an image forming apparatus capable of arbitrarily determining the priority among information to be recorded, thereby achieving smooth information handling.

Still another object of the present invention is to provide an image forming apparatus capable of enabling image recording of a different mode by interrupting the recording operation currently under way, and easily re-starting the recording operation in the interrupted mode.

Still another object of the present invention is to provide an image forming apparatus capable of image recording without complicated signal exchange between the recording unit and the signal output unit, and without exclusive circuits or complicated programs even when recording with size modification or with trimming.

Still another object of the present invention is to provide an image forming apparatus capable, in copying an original, of easily extracting or erasing a desired area.

Still another object of the present invention is to provide an image forming apparatus capable of simplifying the feed control for recording sheets, thereby reducing the burden of the external devices.

Still another object of the present invention is to provide an image forming apparatus allowing, in the image synthesis mode, the determination of the number of recordings in any of plural information sources, thereby, ensuring the recordings of a desired number.

Still another object of the present invention is to provide an image forming apparatus allowing, in recording information to be supplied from an external device, the recording unit to confirm the number of recordings.

Still another object of the present invention is to provide a display device capable of displaying even a very large quantity.

These objects are attained by the invention disclosed in the accompanying drawings and detailed description, wherein an image forming apparatus is provided with a first image forming unit for image reproduction from an original image, and a second image forming unit for image reproduction from image signals, for achieving easier interruption imaging and complicated image processing. To facilitate this configuration a photosensitive drum may be provided for receiving a latent image and for transferring that latent image to an insulative drum for developing and transfer. Additionl image information can be put directly onto the insulative drum.

The foregoing and still other objects of the present invention, and the advantages thereof will become fully apparent from the following description.

BRIEF DESCRIPTION OF THE DRAWINGS

FIGS. 2-1 to 2-3 are schematic views showing the structure of a screen drum SD;

FIG. 3 is a schematic view showing the charged state of the screen drum SD;

FIGS. 14-1 to 14-3 are schematic views showing a recording operation with image trimming or synthesis;

FIGS. 15(a) and 15(b) are external views of a display-operation unit;

FIGS. 16-1(a) and (b) and 16-2(a), (b), and (c) are schematic views showing a copying operation with extraction of a part of the original image;

FIG. 17 is a circuit diagram showing the connection between the display-operation unit and an I/O port controller; and FIGS. 18 to 21, 21A, 21B, and 22 to 24 are flow charts showing the control procedures for the apparatus embodying the present invention.

DETAILED DESCRIPTION OF THE PREFERRED EMBODIMENTS

Figure 1:
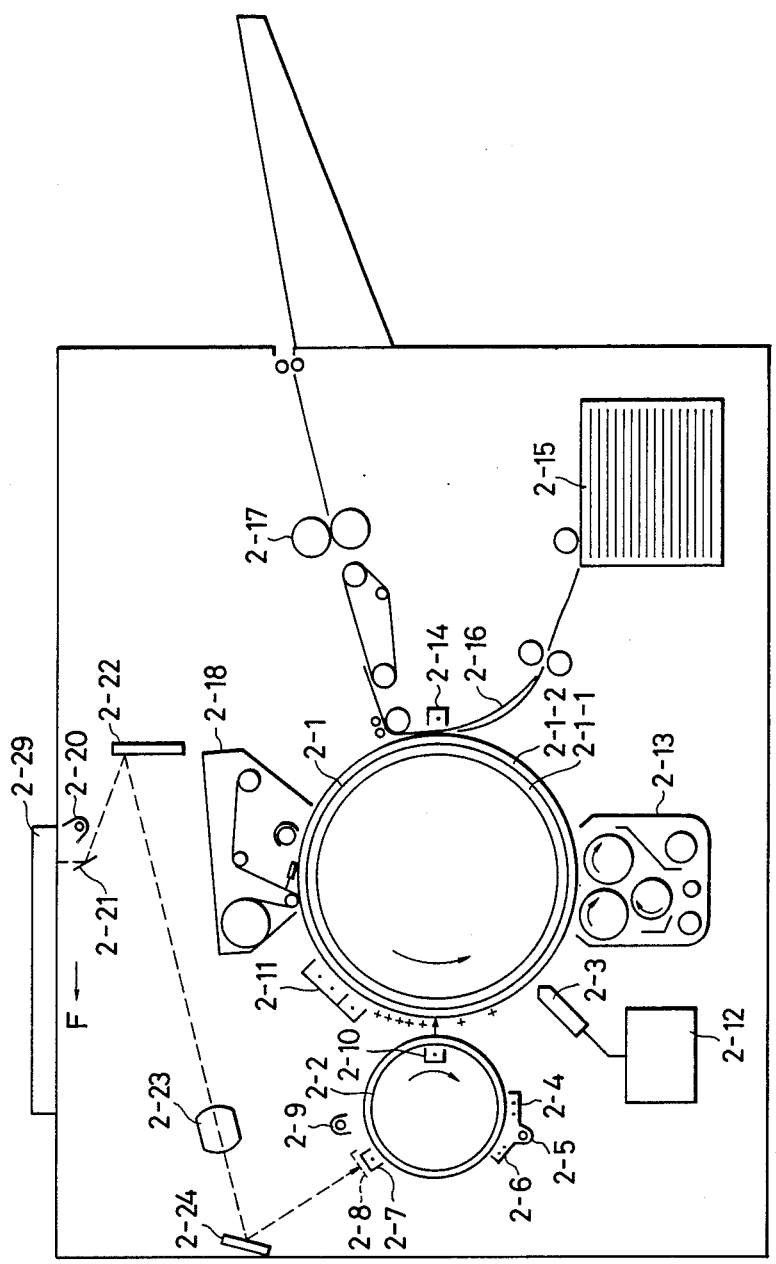
FIG. 1 is a cross-sectional view showing the internal structure of an apparatus embodying the present invention.

FIG. 1 shows the structure of an apparatus embodying the present invention where a latent image is formed on a recording medium comprising an insulator drum (ID) 2-1 provided with a dielectric layer thereon, by means of a screen drum (SD) 2-2 which constitutes a first image forming means for producing a latent image in response to the light from an original image, and of a multi-stylus head 2-3 which constitutes a second image forming means equipped with a linear array of plural pin electrodes for producing an image in response to digital signals.

The screen drum 2-2 is used for storing the image of the original in the form of an electrostatic latent image, while the insulator drum 2-1 is used for converting the electrostatic latent image transferred from the screen drum 2-2 or the electrostatic latent image formed by the multi-stylus head 2-3 into a visible image and transferring the same onto a recording sheet. In the following description the electrostatic latent image formed on the screen drum 2-2 shall be called a primary latent image, while that transferred onto the insulating drum 2-1 shall be called a secondary latent image.

Figures 1, 2:
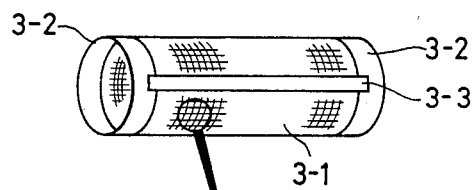
Figure 2:
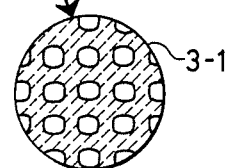
Figures 2, 3:
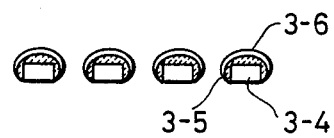
Figure 3:
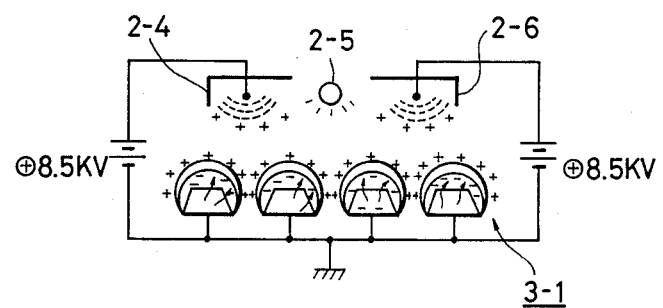

FIGS. 2-1, 2-2 and 2-3 show the structure of the screen drum 2-2, respectively in a perspective view, a partial enlarged view of a screen 3-1 and a cross-sectional view thereof.

The screen 3-1 is a photosensitive sheet or screen composed of a conductive substrate net 3-4, covered in succession with a sprayed layer 3-5 of a photoconductive material such as CdS and a sprayed layer 3-6 of an insulating substance. The screen 3-1 is fixed in cylindrical form on a drum frame 3-2 and the seam of the screen is sealed with a tape 3-3. The screen drum is provided with a plurality of small holes as shown in FIG. 2-2, each of which is exposed to the three-layered structure as shown in FIG. 2-3.

The insulating drum (ID) 2-1 has a diameter twice as large as that of the screen drum, and is of a two-layered structure comprised of an aluminum cylinder 2-1-1 covered on its surface with a uniform coating of a dielectric substance 2-1-2, not including the photosensitive layer. The ratio of diameters of the screen drum 2-2 and the insulating drum 2-1 is equal to 1:2 so that the latter makes two turns while the former makes one turn.

In the following there will be given an explanation on the image forming process in the present embodiment.

At first the screen drum 2-2 is rotated and is uniformly charged, positively, by means of a charger (A) 2-4, a charger (B) 2-6 and a primary exposure lamp 2-5.

FIG. 3 shows the process of uniform charging. In the present embodiment, a corona discharge is induced by applying a voltage of +8.5 kV between the screen drum 2-2 and a charger, thereby uniformly charging, positively, the surface of the screen drum 2-2. In order to ensure a sufficient surface potential on the screen drum 2-2, the charger (A) 2-4 is at first used for positive charging, then an exposure lamp 2-5 illuminates the charged surface to improve the injection efficiency of negative charge, and the positive charging is repeated by the charger (B) 2-6.

In the above-mentioned step the screen drum 2-2 acquires a surface potential of ca. 200–300 V. As the charged drum surface reaches a charger (C) 2-7 by the rotation in a direction indicated by the arrow, it is exposed to the light reflected from an original through a slit 2-8, simultaneous with negative charge elimination by the charger (C) 2-7.

Figure 4:
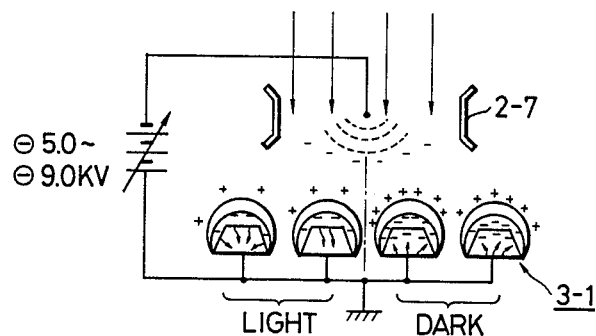
FIG. 4 is a schematic view showing an image exposure process.

The original placed on an original carriage 2-29 is illuminated by an illuminating lamp 2-20 moving in a direction F at a determined speed, and the reflected light is transmitted through a first mirror 2-21 moving integrally with the lamp 2-20, a second mirror 2-22 moving at a speed equal to half that of the first mirror 2-21, a lens 2-23, a third mirror and the slit 2-8 and focused on the screen drum 2-2. FIG. 4 shows the step of image exposure simultaneous with the negative charge elimination achieved by a voltage of −5.0 to −9.0 kV applied by the charger (C) 2-7.

In a lighted area, corresponding to a white area of the original, the resistance of the CdS layer 3-5 is reduced so that the trapped negative charge acquires a higher mobility. Then as the surface positive charge of the screen drum 2-2 is dissipated by the application of negative corona, the negative charge in the CdS layer 3-5 escapes to the conductive substrate 3-4.

On the other hand, in a dark area corresponding to a black area of the original, the negative charge in the CdS layer 3-5 is maintained by the high resistance thereof. The negative corona eliminates some of the positive charge on the surface, but a corresponding charge is induced in the conductive substrate 3-4 to maintain an electrical equilibrium.

In this stage the surface potential is zero both in the light area and dark area, so that there is no potential contrast. In the dark area, no potential appears despite the presence of charges.

Figure 5:
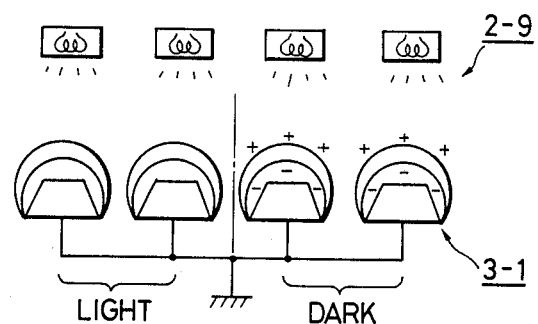
FIG. 5 is a schematic view showing the state of surface charge.

In the course of further rotation of the screen drum 2-2, a primary electrostatic latent image is formed by a uniform exposure lamp 2-9. FIG. 5 shows the charge distribution in this state.

Uniform illumination by the lamp 2-9 causes no change in the lighted area since the charges on the insulating layer 3-6 and in the CdS layer 3-5 are already eliminated.

On the other hand, in the dark area, the resistance of the CdS layer 3-5 is reduced, so that the negative charge therein not bound by the surface charge becomes mobile and is neutralized with the positive charge in the conductive substrate 3-4. A positive charge still remains thereafter on the insulating layer 3-6 to exhibit a surface potential, constituting the primary electrostatic latent image.

Thus a primary electrostatic latent image is produced, through a single exposure, on the screen drum 2-2 by the above-mentioned and slowly conducted procedure.

Then, upon further rotation of the screen drum 2-2 to the positive charger (D) 2-10, ion flow resulting from the negative discharge thereof transfers the primary electrostatic latent image on the screen drum 2-2, at a high speed, to the insulating drum 2-1 distanced by 2 mm.

The insulating drum 2-1 rotates in synchronization with the screen drum 2-2 and is uniformly charged, positively, by a charger (G) 2-11. In this state the primary electrostatic latent image is transferred as explained above by the charger (D) 2-10 from the screen drum 2-2, thereby forming a secondary electrostatic latent image on the insulating drum 2-1.

Figure 6:
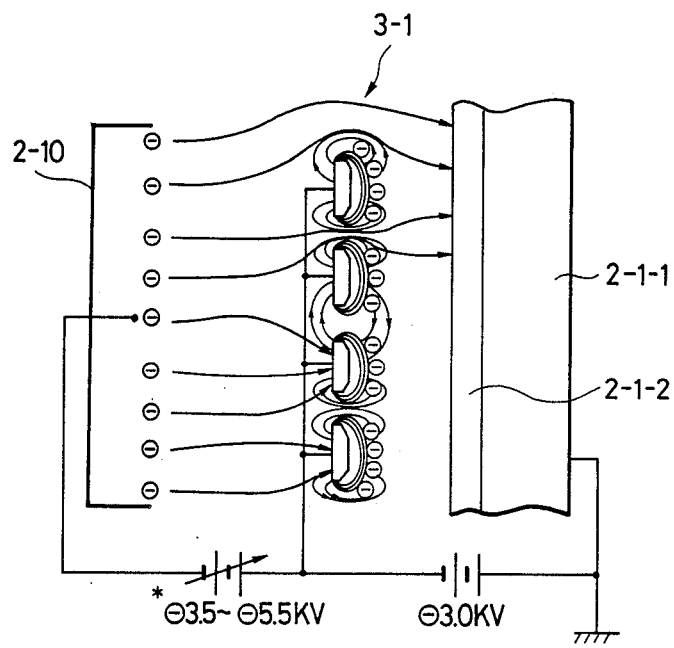
FIG. 6 is a schematic view showing a latent image transfer process.

Reference is now made to FIG. 6 further showing the process of latent image transfer. In this step a bias voltage of −3.0 kV is applied to the screen drum 2-2, and a negative corona discharge is applied from the interior of the screen drum 2-2 to negatively charge the insulating drum 2-1 through the screen structure of the screen drum 2-2, thus transferring the primary latent image thereon to the insulating drum 2-1 distanced by 2 mm and forming the second latent image thereon.

In a positively charged area on the screen drum 2-2, representing a dark area, there is formed an electric field as indicated by fine lines in FIG. 6, whereby the negative ions from the charger (D) 2-10 are accelerated by the field and reach the insulating drum 2-1 through the apertures of the screen. Consequently the positve charge on the insulating drum 2-1 is dissipated in the image area.

On the other hand, in a non-charged area on the screen drum 2-2, representing a light area, the electric field is weaker than in the dark area, so that the negative ions are mostly absorbed by the conductive substrate 3-4 of the screen. Thus the surface of the insulating drum is scarcely influenced by the corona discharge. In fact a negative charge present in the light area of the screen drum 2-2 generates an electric field directed opposite to the field generated by the charger (D) 2-10, inhibiting the passage of the negative ions resulting from the corona discharge.

The latent image transfer to the insulating drum 2-1 can be repeated several times, by means of the primary latent image formed on the screen drum 2-2, until the quantity of the charge present on the screen drum 2-2 becomes lower than a predetermined value. Consequently, several copies can be obtained from a single exposure of the original.

The secondary electrostatic latent image corresponding to a light image is formed on the insulating drum 2-1 according to the above-described process. In the case of copying such an image alone on a plain paper, the secondary latent image on the insulating drum 2-1 is rendered visible with positive toner in a developing station 2-13.

The visible toner image thus obtained is transferred, by a transfer charger 2-14, onto the plain paper 2-16 supplied at a predetermined time from a sheet feeding table 2-15, and is fixed by heat or pressure in a fixing station 2-17 to complete a plain paper copy of the optical image of an original. After the transfer of the toner image, the toner remaining on the insulating drum 2-1 is eliminated in a cleaning station 2-18.

As shown in FIG. 1, a multi-stylus head 2-3 is positioned between the latent image transfer position from the screen drum 2-2 and the developing station 2-13. In the case of image recording by synthesizing a secondary latent image formed from light image and a digital image formed by the multi-stylus head, the following procedure is conducted after the latent image transfer from the screen drum 2-2 to the insulating drum 2-1. At the above-described state of uniform positive charging of the insulating drum 2-1 by the charger (G) 2-11 and subsequent latent image transfer onto the insulating drum 2-1 by the charger (D) 2-10 positioned inside the screen drum 2-2, the charge on the insulating drum 2-1 is dissipated in an area corresponding to the dark area of the original but remains intact in an area corresponding to the light area of the original.

Then, when the secondary latent image on the insulating drum 2-1 reaches a position under the multi-stylus head 2-3, a negative pulse Vp is applied from a stylus driver 2-12 to the multi-stylus head 2-3 to generate a discharge between the head and the insulating drum 2-1, whereby the positive charge present, corresponding to the light area of the original, is dissipated. In this manner a digital image corresponding to the activation of the multi-stylus head 2-3 is synthesized in the light area of the original.

The above-mentioned procedure enables the synthesis of the image corresponding to an original and the digital image generated by the multi-stylus head 2-3, but such a digital latent image alone can be formed on the insulating drum 2-1 without any change in the conditions of charge if the latent image transfer from the screen drum 2-2 to the insulation drum 2-1 is omitted.

Consequently, it is rendered possible not only to record the information transmitted from an external apparatus such as a word processor, an office computer, a facsimile or the like but also to copy an original image with a single apparatus, and further to synthesize or overlay the information from the external apparatus on the original image.

Figure 7:
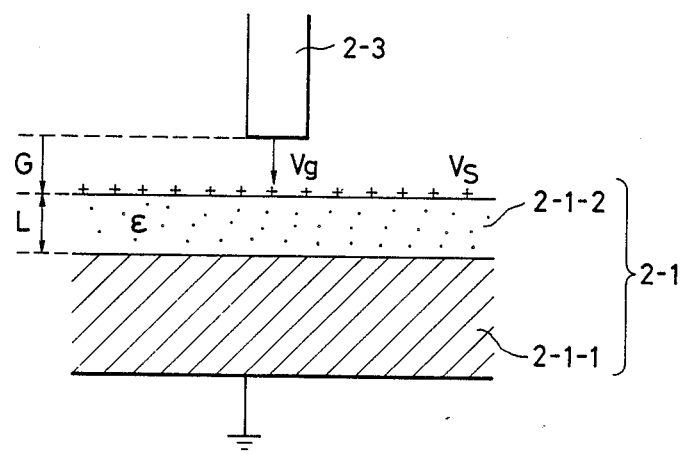
FIG. 7 is a schematic view showing the relationship between driving pulses and interval of multiple styli.

Now reference is made to FIG. 7 for explaining the driving pulse Vp for driving the multi-stylus head 2-3. Assuming that the insulating drum 2-1 is uniformly charged by the charger (G) 2-11 to a potential Vs, a preferable stylus driving (negative) voltage Vp for dissipating the positive charge remaining on the insulating drum 2-1 is determined, in relation to an appropriate gap voltage Vg for generating a discharge, by the following equation:

$$Vg = \frac{(Vs - Vp) G}{L/\epsilon + G}$$

wherein L and $\epsilon$ respectively represent the thickness and dielectric constant of the insulating layer 2-1-2 of the insulating drum 2-1, and G stands for the distance between the frond end of stylus 2-3 and the insulating drum 2-1. The discharge is initiated when the gap voltage Vg exceeds a value determined by Paschen's law, thus generating an electrostatic latent image on the insulating drum by the multi-stylus head 2-3.

In the present embodiment, the above-described condition is satisfied by a surface potential Vs= +400 V, a stylus potential of −150 V and a gap G=10 μm. The styli are given a bias voltage $V_B$ equal to +100 V in order to prevent discharge from non-activated pins.

As explained in the foregoing, the present embodiment is capable of forming an image obtained from the original and an image generated by the multi-stylus head, independently or in combined manner, without any change in the conditions of the insulation drum.

Now there will be given an explanation on the structure and the function of the multi-stylus head 2-3 and the multi-stylus driver 2-12 shown in FIG. 1.

Figure 8:
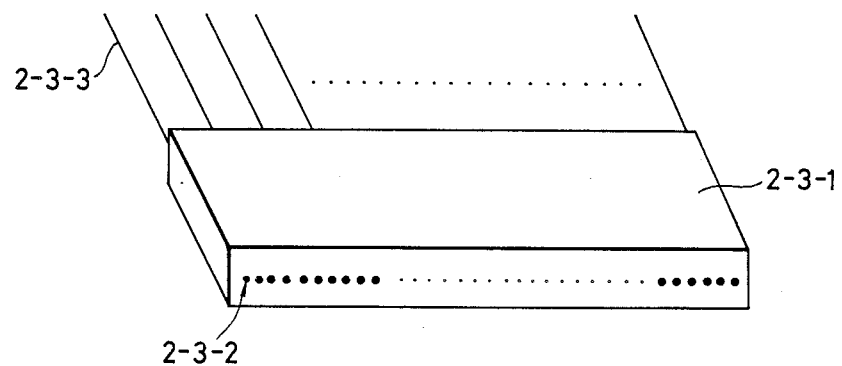
FIG. 8 is a schematic external view of multiple styli.

FIG. 8 shows the schematic external view of the multi-stylus head.

A recording head portion 2-3-1 of the multi-stylus head is provided with a linear array of pin electrodes 2-3-2 arranged at an interval of 1/16 mm. There are provided 4096 pin electrodes to cover the shorter side (256 mm) of a B4-sized recording sheet. The pin electrodes are comprised of nickel wires covered with polyurethane, and insulated by molding therearound with epoxy resin. The recording head portion 2-3-1 is provided with high-voltage transistors of the same number as that of the pin electrodes in order to independently drive the pin electrodes. The head is provided with control lines 2-3-3 for driving the pin electrodes.

Figure 9:
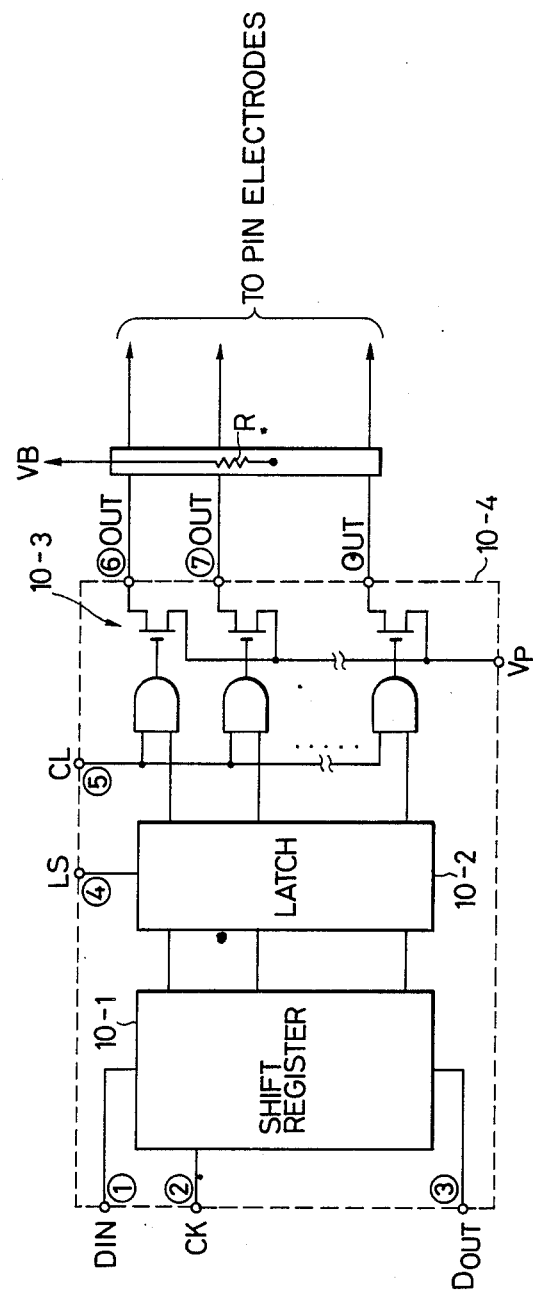
FIG. 9 is a diagram showing the internal structure of a stylus head.

FIG. 9 shows the structure of a drive provided in the multi-stylus head and comprised of a MOS IC 10-4 containing several tens of sets of a shift register 10-1, a latch circuit 10-2 and a high-voltage MOS field-effect transistor (FET) 10-3, and such IC's provided as necessary. In the present embodiment the multi-stylus head contains 128 MOS IC's of 32 bits each, for achieving the following function.

Serial pixel data are supplied to a data input terminal DIN (1) in synchronization with clock signals supplied to a clock terminal CK (2), and stored in the shift register 10-1. After storage, the pixel data in the shift register are latched by a latch signal supplied to a latch terminal LS (4), and thus latched data are used for driving the MOS FET's 10-3. The outputs (6), (7), ... of the transistors 10-3 are pulled up to the aforementioned positive bias voltage $V_B$ by a resistor R, and the emitters of the transistors receive the aforementioned negative driving voltage Vp. A terminal $\overline{CL}$ (5) is activated when the MOS FET's are to be turned off.

Thus, negative pulses of a voltage Vp are applied to the pin electrodes for causing discharge when the MOS FET's 10-3 are activated by a non-active clear signal $\overline{CL}$. In the present embodiment all the styli are driven by serially connecting data output terminals DOUT (3) and data input terminals DIN (1) of the MOS IC's 10-4 of necessary number. The terminals DIN (1), CK (2), LS (4) and $\overline{CL}$ (5) are used as control lines 2-3-3 as shown in FIG. 8 and are connected to the multi-stylus driver 2-12 shown in FIG. 2.

Figure 10:
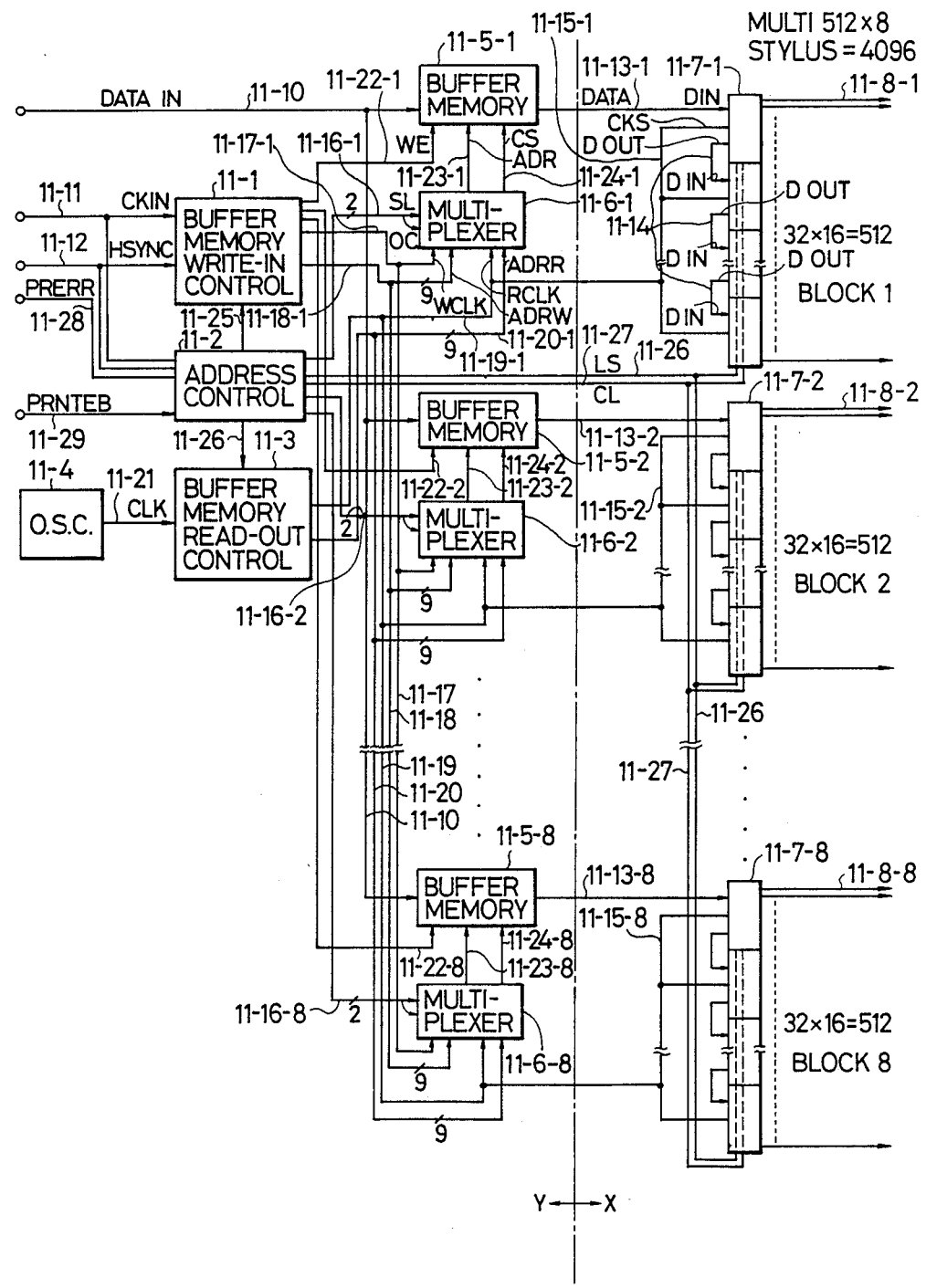
FIG. 10 is a block diagram showing the structure of a multi-stylus driver.

FIG. 10 shows an example of the multi-stylus driver 2-12, wherein the multi-stylus head and the multi-stylus driver are shown respectively in areas X and Y separated by a chain line.

There are provided a buffer memory write-in control unit 11-1; an address control unit 11-2; a buffer memory read-out control unit 11-3; a clock generator for transferring the recording data to the multi-stylus head; a buffer memory 11-5 capable of storing data of 512 bits; and high-voltage MOS IC's 11-7 with shift register shown in FIG. 9.

In the present embodiment, 4096 pin electrodes are divided into 8 blocks (blocks 1 to 8), each containing 512 pin electrodes. Each MOS IC block 11-7 is provided with 512 outputs by serially connecting 16 MOS IC's of 32 bits shown in FIG. 10 by the output terminals (DOUT) and input terminals (DIN) thereof through lines 11–14.

Each of the blocks 1 to 8 is connected to a data input line 11 11-13, a shift clock line CKS 11-15, a data latch line LS 11-26 and a clear line 11-27.

The stylus driver receives, from outside, for example from an output device of a large computer, a data signal DATAIN 11-10, a clock signal CKIN 11-11 and a horizontal synchronization signal HSYNC 11-12, and releases a print error signal PRERR 11-28 to the outside in case of a data error.

The external serial image signal DATAIN 11-10 are entered in succession to the buffer memories 11-5-1 to 11-5-8 of 512 bits each. The clock signal CKIN 11-11 is used for entering the image signal into said buffer memories. The horizontal synchronization signal HSYNC 11-12 represents the data effective period of a line, during which the image signal is entered into the buffer memories.

The serial image signal DATAIN 11-10 of 4096 bits is entered in succession into the eight buffer memories 11-5-1 to 11-5-8 in synchronization with the clock signal CKIN 11-11. Upon storage of data of 512 bits into the buffer memory 11-5-1, the image signal is supplied in successive manner to an input terminal DIN of the MOS IC 11-7-1 through a data line 11-13-1 in synchronization with a readout clock signal CLK 11-21 supplied from an oscillator OSC 11-4. The MOS IC 11-7-1 receives a clock signal CLK 11-21 supplied from the oscillator 11-4 as a shift clock signal 11-15-1 through the buffer memory readout control unit 11-3, whereby the image signal is entered into the shift register in the MOS IC shown in FIG. 9, in synchronization with said shift clock signal 11-15-1.

The above-described procedure is conducted in each block, and upon completion of entry of all the data of a line into the shift registers shown in FIG. 9, the FET in the MOS IC is controlled by the latch signal LS 11-26 to apply voltages corresponding to the image signal to the pin electrodes.

The clock signal CKIN 11-11 is externally supplied to the multi-stylus driver, while the shift clock signal CKS 11-15 supplied to the shift register of the MOS IC is an internal clock signal independent from the aforementioned clock signal CKIN 11-11. Thus, in the case when a new data signal is externally entered before the end of the latch signal 11-26 instructing the data latch to the shift register, namely if the horizontal synchronization signal HSYNC 11-12 is released, the address control unit 11-2 releases the signal PRERR 11-28 to the outside for indicating an error. In the present embodiment the internal clock signal CLK 11-21 is of a frequency of 4 MHz, and, the above-mentioned signal PRERR 11-28 is released unless a period from the entry of the final signal of a line into the buffer memory 11-5-8 to the start of signal entry of a next line exceeds $\frac{1}{4}$ MHz×512=128 μsec. A signal PRNTEB 11-29 is supplied from a control unit, to be explained later, to the address control unit 11-2 and is used for permitting the output of a digital image signal of a page to an external apparatus. In the absence of the signal PRNTEB, the data signal is not supplied to the multi-stylus head even if the signals DATAIN 11-10, CKIN 11-11 and HSYNC 11-12 are released from the external apparatus.

Figure 11:
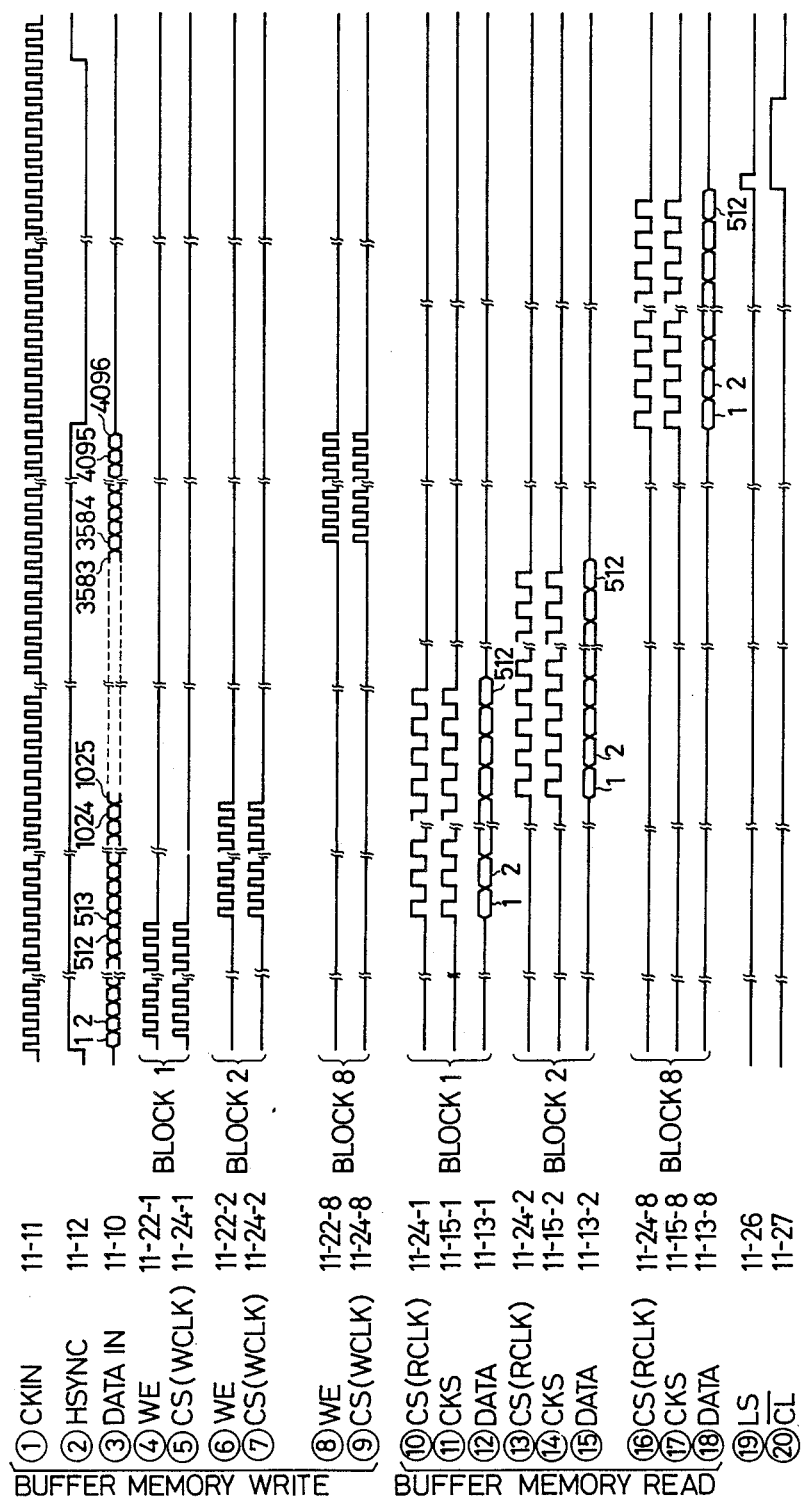
FIG. 11 is a timing chart showing the input/output operations of a buffer memory.

Now reference is made to a timing chart shown in FIG. 11 for further explaining the input-output operation of the buffer memories.

At first, at the start of the horizontal synchronization signsal HSYNC 11-12 (curve (2)), the address control unit 11-2 activates the buffer memory write-in control unit 11-1, which in turn supplies a write clock signal WCLK 11-17-1 and a write address signal ADRW 11-18-1 through a multiplexer 11-6-1 to the buffer memory 11-5-1 thereby storing the entered image signal DATAIN 11-10 into the buffer memory 11-5-1.

The write clock signal WCLK 11-17-1 is released in synchronization with the external clock signal CKIN 11-11 (curve (1)), and, through selection by the multiplexer 11-6-1, is supplied as a chip selecting signal CS 11-24-1 (curve (5)) to the buffer memory 11-5-1.

The 9-bit write address signal ADRW 11-18-1 is renewed in succession from "0" to "511" in synchronization with the write clock signal WCLK 11-17-1, whereby the data of 512 bits (1–512 in curve (3)) are stored in the buffer memory 11-5-1, which receives, at the signal write-in, a write enable signal WE 11-22-1 (curve (4)) in synchronization with the chip selecting signal 11-24-1 (curve (5)).

In this manner the 1st to 512th bits of the entered signal DATAIN (curve (3)) are stored in the buffer memory 11-15-1 of the block 1 by means of the write enable signal WE(4) and the chip selecting signal CD(5).

The signal write-in into the buffer memory of each block is achieved by shifting the multiplexer 11-6 to a write mode by a 2-bit selection signal 11-16 (SL and OC) released by the address control unit 11-2. The operating mode of each multiplexer 11-6 is selected as shown in the following table by an active signal "1" and a non-active signal "0":

|  | no selection | write selection | read selection |
|---|---|---|---|
| SL (selection) | X | 0 | 1 |
| OC (output control) | 0 | 1 | 1 |

(X:0 or 1)

Thus, in the case of data storage in the buffer memory 11-5-1 of the block 1, the address control unit 11-2 supplies a selection signal 11-16-1 (SL, OC)=(0, 1) to the multiplexer 11-16-1, whereby the multiplexer 11-6-1 is shifted to the write-in mode, thus releasing the write clock signal WCLK 11-17-1 as the chip selecting signal CS 11-24-1 (curve (5)) and the write address signal ADRW 11-18-1 as the address signal ADR 11-23-1.

Then, in case of data read-out from the buffer memory 11-5-1 of the block 1, the selection signal 11-16-1 is changed to (SL, OC)=(1, 1), whereby the multiplexer is shifted to the read-out mode to release a read clock signal RCLK 11-19-1 as the chip selecting signal CS 11-24-1 (curve (10)) and a read address signal ADRR 11-20-1 as the address signal ADR 11-23-1.

The read/write selection of the buffer memory is conducted in the following manner:

|  | no selection | memory write-in | memory read-out |
|---|---|---|---|
| WE (write enable) | X | 1 | 0 |
| CS (chip selection) | 0 | 1 | 1 |

(X:0 or 1)

Thus, in the case of signal write-in into the memory, the write enable signal WE is supplied to the buffer memory 11-5-1 in synchronization with the chip selecting signal CS (curve (4) and (5)), and in the case of signal read-out from the memory, the chip selecting signal alone is supplied to the buffer memory 11-5-1 (curve (10)).

Upon completion of storage of data of 512 bits into the buffer memory 11-5-1 of the block 1 in the above-described manner, the address control unit 11-2 supplies the selecting signal (SL, OC) to the multiplexer 11-6-2 of the block 2 for executing the signal write-in to the buffer memory 11-5-2. Then the write enable signal WE(6) and the chip selecting signal CS(7) shown in FIG. 11 are supplied to the buffer memory 11-5-2 of the block 2, thus storing the 513th to 1024th bits of the data therein.

On the other hand, after the completion of the signal write-in operation of the buffer memory 11-5-1 of the block 1 (curves (4) and (5)), the address control unit 11-2 shifts the multiplexer 11-6-1 of the block 1 to the read-out mode, by means of a selecting signal (SL, OC)=(1, 1). The buffer memory readout control unit 11-3 receives a read start signal 11-26 from the address control unit 11-2 in synchronization with a 512th pulse of the write clock signal WCLK 11-17-1 (curve (7)) and supplies the read clock signal RCLK 11-19-1 and the read address signal ADRR 11-20-1 to the multiplexer 11-6-1, which in turn supplies the signals respectively as the chip selecting signal CS 11-24-1 and the address signal ADR 11-23-1 to the buffer memory 11-15-1. The read address signal ADRR 11-20-1 is changed from "0" to "511" in synchronization with the read clock signal RCLK 11-19-1, thus serially reading the 512-bit data in the buffer memory 11-5-1 through a data line 11-13-1.

As indicated by the curves (10), (11) and (12) in FIG. 11, the data read-out from the memory is executed at the start of the read clock signal, and the data entry into the shift register of the MOS IC 11-7-1 is executed at the end of the shift clock signal CKS synchronized with the read clock signal CS.

The signal read-out is conducted in succession from the buffer memory which has completed the signal write-in as shown in FIG. 11, and the above-described procedure is conducted from the block 1 to the block 8, thus storing the data of 4096 bits (1 line) into the MOS IC's 11-7-1 to 11-7-8.

Upon storage of a signal of the 512th bit of the block 8 (curve (18)) into the MOS IC 11-7-8, the latch signal 11-26 (curve (19)) is supplied simultaneously to all the MOS IC's 11-7 to release the signals to the multi-stylus head 11-8-1 to 11-8-8. The clear signal $\overline{CL}$ 11-27 (curve (20)) is rendered inactive for a determined period from the latch signal, and the discharge from the multi-stylus head is conducted during this period.

The horizontal synchronization signal HSYNC 11-12 for the next line has to be started after the latch signal LS 11-26 is released. Thus, if the horizontal synchronization signal HSYNC is started before the latch signal, the print error signal PRERR 11-28 is issued as explained in the foregoing in order to prevent data collision in the buffer memories.

Assuming that the internal clock signal CLK 11-21 has a frequency of 4 MHz, the horizontal synchronization signal HSYNC may have an arbitrary frequency as long as the period from the end of the horizontal synchronization signal HSYNC 11-12 to the start of the next horizontal synchronization signal is equal to or exceeds $\frac{1}{4}$ MHz×512=128 μsec.

As explained in the foregoing, the present embodiment can achieve image recording without the use of detailed control programs or interfaces for recording operation in the external apparatus, through the use of appropriate output timing of the image signal of a line.

In the present embodiment, the insulating drum 2-1 shown in FIG. 1 is rotated at a fixed speed, and the latent image is formed thereon by the multi-stylus head 2-3. It is therefore possible, as shown in FIG. 12(a) and (b), to modify the image size in a direction, namely in the rotating direction of the insulating drum 2-1, by regulating the frequency of the external clock signal, namely of the horizontal synchronization signal HSYNC.

Figure 12:
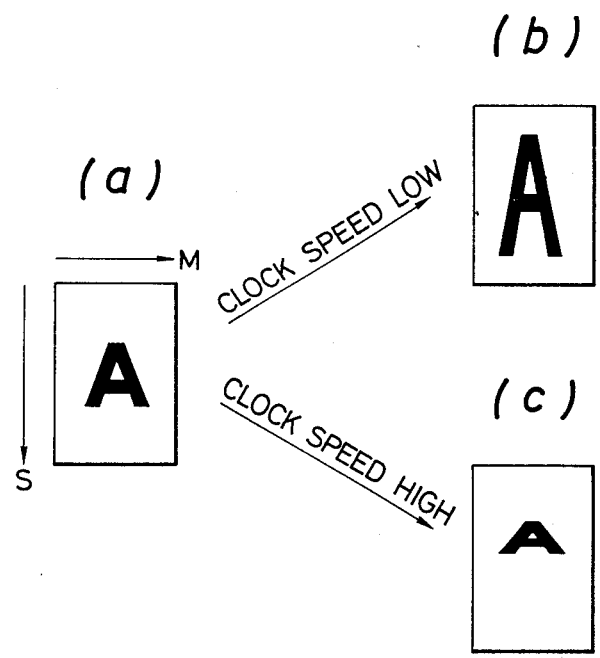
FIG. 12 is a schematic view showing a recording operation with size modification.

More specifically, in the case of driving the multi-stylus head with the original signal as shown in FIG. 12(a), the obtained copy can be extended in the subsidiary scanning direction as shown in FIG. 12(b) by the use of slower clock pulses, or compressed in the subsidiary scanning direction as shown in FIG. 12(c) by the use of faster clock pulses. Also ordinary image expansion or compression including the main scanning direction M can be achieved without any burden on the printer unit, by externally modifying the sampling frequency of the image signal stored in the buffer memories 11-5, namely of the data transmission to the recording unit.

In this manner a modified size image recording can be achieved without any processing on the image to be recorded, by simply controlling externally the clock frequency or the sampling frequency.

Figure 13:
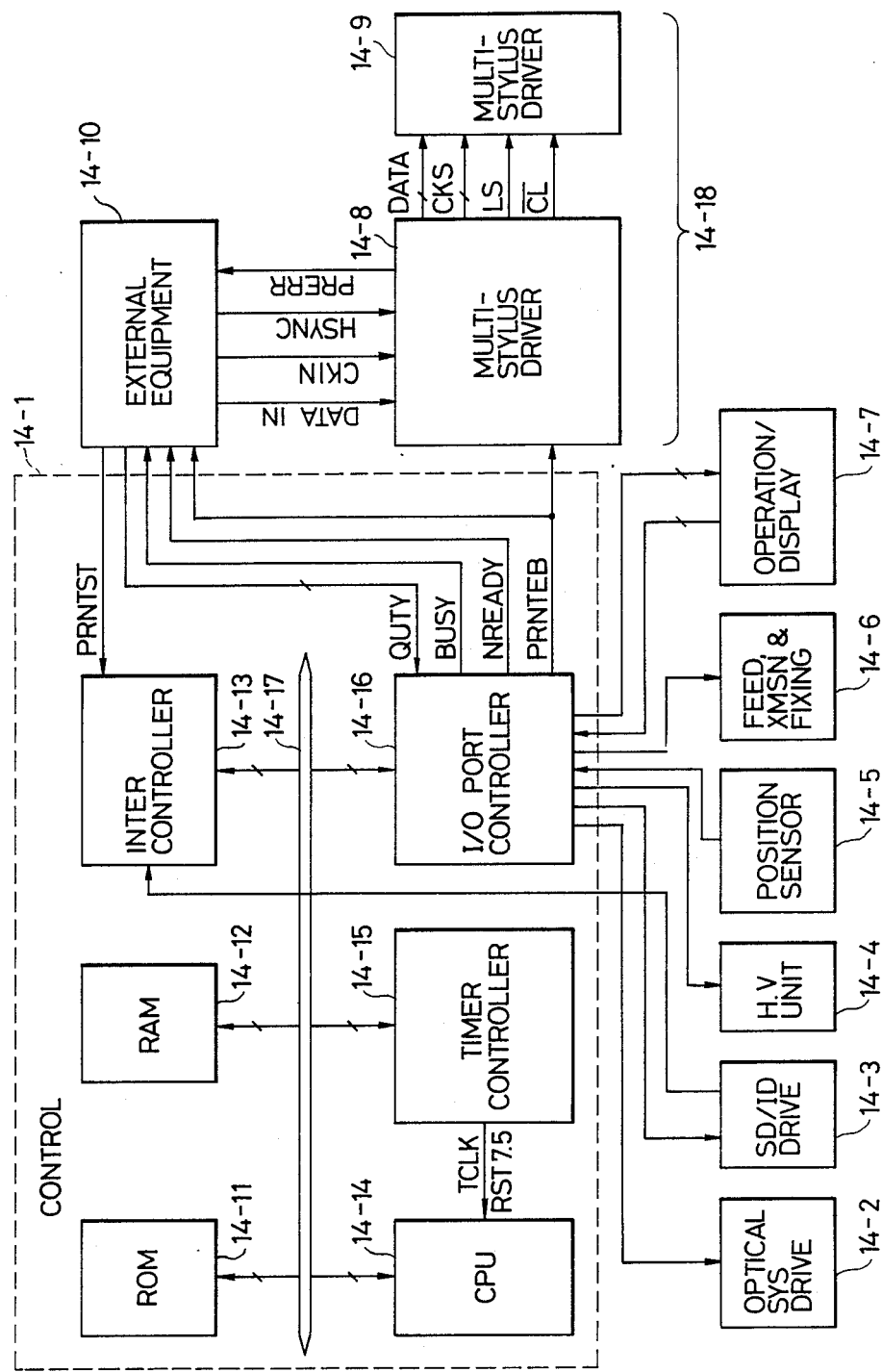
FIG. 13 is a block diagram showing the circuit structure of the apparatus embodying the present invention.

FIG. 13 shows the connection among the control unit 14-1, driving units 14-2 to 14-7, multi-stylus head 14-18 and external equipment 14-10. The control unit 14-1 principally comprises a central processing unit (CPU) 14-14 composed of a microprocessor, and is further provided with a read-only memory (ROM) 14-11, a random access memory (RAM) 14-12, an interruption controller 14-13, an I/O port controller 14-16 and a timer controller 14-15 which are connected to the CPU 14-14 through an address/data bus 14-17. The address/data bus 14-17 is of a 16-bit structure, of which the upper 8 bits are used for addressing the upper 8 bits of memory address or the I/O address, while the lower 8 bits are used, in the first clock cycle of the CPU 14-14, for addressing the lower 8 bits of memory address or I/O address, and used as a bidirectional 8-bit data bus in the 2nd or 3rd clock cycle of the CPU 14-14. The CPU 14-14 is composed of an element 8085A supplied by Intel Corp. of which details are described in the corresponding manual.

The ROM 14-11 is used for storing the control program, and the RAM 14-12 is used as a work memory for the CPU 14-14. The timer controller 14-15 supplies clock pulses of an interval of 10 msec. to an interruption port RST 7.5 of the CPU 14-14 for counting the period of the control program. The interruption controller 14-13 receives a clock signal DRMCLK corresponding to the rotation angle of the screen drum 2-2 and the insulating drum 2-1, with a rate of 360 pulses per full turn of the screen drum 2-2 or 720 pulses per full turn of the insulating drum 2-1. The interruption controller 14-13 also receives a print start signal PRNTST from an external digital image output apparatus such as a large computer, and a recording sheet is supplied to the recording unit in response to the signal.

The I/O port controller 14-16 is connected to an optical system driving unit 14-2 for original scanning, a screen drum/insulating drum driving unit 14-3, a high-voltage control unit 14-4, position sensors 14-5, a sheet feed/transport/fixing unit 14-6 and an operation/display unit 14-7 for controlling the functions and detections of these units. The I/O port controller 14-16 is connected also the external apparatus 14-10.

A 12-bit input signal QUTY is used for designating the copy number desired by the external apparatus 14-10 simultaneously with the print start signal, and is capable of designating the copy number in a range from 1 to 4095 copies. In order to obtain multiple copies the external apparatus 14-10 is required only to supply the initial print start timing, and thereafter to release the data in synchronization with the signal PRNTEB. A single copying operation is conducted in response to the signal QUTY composed of all "0". Thus, a user not requiring multiple prints by the signal QUTY needs only to release the print start signal PRNTST.

A signal BUSY indicates to the external apparatus that an optical copying operation or an original is under way, but the signal is not released in the course of synthesizing an optically copied image with a digital image supplied from the external apparatus 14-10.

A signal NREADY indicates an abnormality in the apparatus to the external apparatus 14-10, and the signal is rendered active when the apparatus is not available due to absence of a copying sheet, sheet jamming or waiting cycle of the apparatus.

A signal PRNTEB permits, in case of recording a digital image supplied from the external apparatus 14-10, the external apparatus to release the image signal of a page over a predetermined period from the print start signal PRNTST, whereby the external apparatus 14-10 can supply the digital image signal to the multi-stylus head 14-18 during this period. Also in case of synthesizing an optically copied image and a digital image from the external apparatus 14-10, the signal PRNTEB is released at a determined time after the start of latent image transfer from the screen drum 2-2 to the insulating drum 2-1 as explained in relation to FIG. 1, and this time corresponds to a rotation angle of the insulating drum 2-1 from the latent image transfer position by the charger (D) 2-10 to the multi-stylus head 2-3 and is obtained by counting the clock signal DRMCLK by the CPU 14-14. this signal is supplied also to the address control unit 11-2 shown in FIG. 10.

Figures 1, 14:
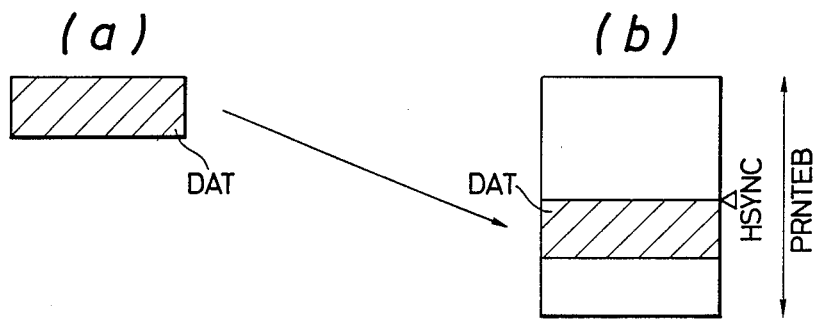
Figures 2, 14:
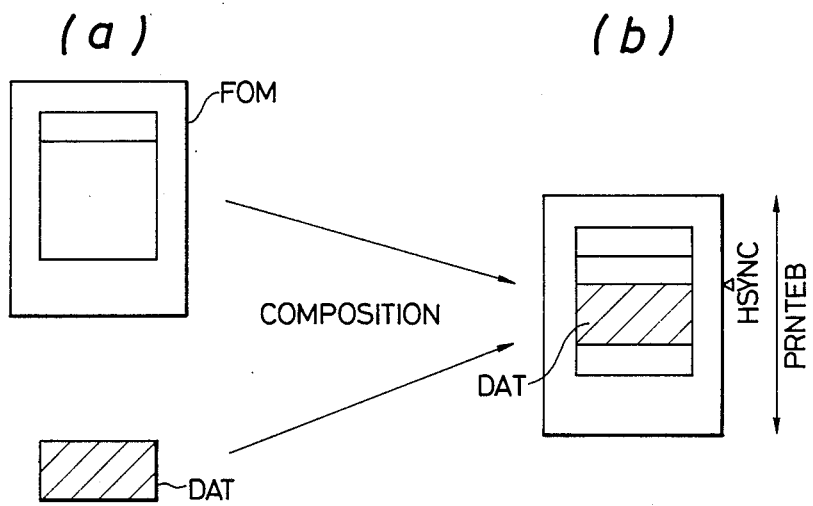
Figures 3, 14:
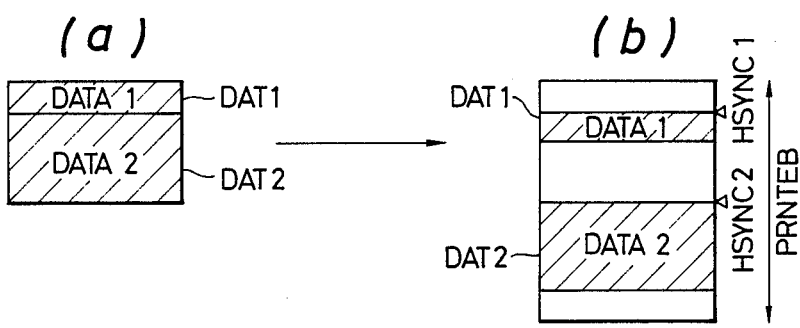

The signal PRNTEB, being capable of defining the period of permitting the supply of digital signal of a page to the multi-stylus head 2-3, can be utilized for achieving an image recording as shown in FIG. 14-1.

More specifically, in the case when data DAT in the external apparatus is less than a page or in the case when part of the data of a page is released (FIG. 14-1(a)), the data can be recorded at an arbitrary position on the recording sheet, without particular control in the recording unit, by calculating the timing of the first horizontal synchronization signal HSYNC from the external apparatus by means of the desired coordinate position and the rotating speed of the insulating drum and controlling this timing within the period of the signal PRNTEB.

Also an image recording as shown in FIG. 14-2 can be achieved by synthesizing the data DAT from the external apparatus with an image produced by the screen drum 2-2. In this case, a format original FOM is placed on the original carriage 2-29 of the apparatus, and the external data can be recorded in a determined position of the format as shown in FIG. 14-2(b) by controlling the timing of the first horizontal synchronization signal HSYNC at the data output from the external apparatus.

Furthermore an image recording as shown in FIG. 14-3 is also possible. More specifically, when data DAT1 and DAT2 are present continuously in the external apparatus as shown in FIG. 14-3(a), such plural data groups may be recorded at arbitrary positions by generating a first horizontal synchronization signal HSYNC1 for entering the data DAT1 as shown in FIG. 14-3(b) during the period of the signal PRNTEB, and, after the absence of the horizontal synchronization signal HSYNC and the data for a determined duration, generating the horizontal synchronization signal HSYNC 2 and the corresponding data DAT2 thereafter.

As explained in the foregoing, in recording the image information from the external apparatus, the recording unit supplies the external apparatus, the recording unit supplies the external apparatus with a signal indicating a period for permitting the signal output, and the external apparatus releases the image information arbitrarily during this period. Consequently image trimming or synthesis can be achieved, without complicated control, simply by controlling the information output periods from the external apparatus.

Also the progress of image recording can be easily recognized as the number of records from the external apparatus is displayed. Besides, once the recording operation is initiated, the subsequent recording operation can be executed at a timing arbitrarily selected by the recording unit, independent from the external apparatus.

The multi-stylus head 14-18 showsn in FIG. 13, corresponding to that shown in FIG. 10, receives the signals DATAIN, CKIN, HSYNC from the external apparatus 14-10 as explained before, and supplies the external apparatus 14-10 with the signal PRERR in the case of an error. These signals are used for transferring data from the external apparatus 14-10 to the multi-stylus head 14-18. The multi-stylus driver 14-8 supplies the multi-stylus head 14-9 with the same signals DATA, CKS, LS, $\overline{CL}$ as those explained in relation to FIG. 10, in order to transmit the image signal to the multi-stylus head 14-9.

FIG. 15 shows the operation/display unit 14-7, wherein a display unit 15(a) and an operation unit 15(b) are controlled by the CPU 14-14 shown in FIG. 13.

A service call indicator 16-1 is lighted in case of trouble requiring a service call. A paper feed indicator 16-2 is lighted in case a recording sheet is jammed in the apparatus. A developer feed indicator 16-3 is lighted when the toner in the developing unit 2-13 shown in FIG. 1 becomes deficient but the recording operation is still possible. An indicator 16-4 is lighted in the absence of recording sheets in the sheet feeding table 2-15 of the apparatus shown in FIG. 1. A wait indicator 16-5 is lighted while the surface temperature of the fixing roller 2-17 shown in FIG. 1 is lower than a predetermined temperature after the start of power supply. The recording operation is prohibited in case either of the above-mentioned indicators, other than the indicator 16-3 for developer feeding, is lighted.

An original exchange indicator 16-6 is lighted upon completion of the original scanning by the optical system. In the present embodiment as already explained in relation to FIG. 1, a latent image is formed on the screen drum 2-2 by a single exposure of the original, and plural latent image transfers between the screen drum 2-2 and the insulating drum 2-1 are possible without additional exposure of the original. Consequently the original may be exchanged when the indicator 16-6 is lighted, even while a continuous recording operation is still executed.

A copy set number indicator 16-7 can indicate a number up to "999" and performs the following operation:

(a) a copy number designated by numeral keys 16-9 of the operation unit 16-17 is displayed;

(b) the number of records designated by the signal QUTY from the external apparatus 14-10 at the release of the print start signal PRNTST is displayed;

(c) in case of designation in excess of 999 copies by the signal QUTY at the release of the print start signal PRNTST from the external apparatus 14-10, at first recording operations for 999 copies are conducted, and, if the remaining number thereafter becomes equal to or less than "999", the remaining number is displayed and the corresponding recording operations are conducted in succession (In this manner, if the desired copy number exceeds the maximum displayable number, such state is indicated by the display of a determined number (maximum displayable number in this case), and continuous recording operations are rendered possible even in such state);

(d) in response to an interruption, (recording is demanded by the external apparatus 14-10 during a copying operation from an original image only as will be described later), to display the number of recordings designated by the signal QUTY from the external apparatus 14-10 and to display the set copy number of the interrupted copying operation after the completion of recording operations of the designated number; and (e) the case of copying an original by interrupting the recording operation of information from the external apparatus 14-10, as will be explained later, a copy number designated by numeral keys after the interruption is displayed.

A copy count indicated 16-8 displays the count of recording sheets after the start of a recording operation according to the set number indicated on the indicator 16-7, the count being stepped up at each recording operation until it coincides with the number indicator in the indicator 16-7.

There are provided numeral keys and a clear key 16-9, which numeral keys are used for setting the copy number while the clear key (c) resets the set copy number indicator 16-7 and the copy count indicator 16-8 respectively to "001" and "000". The numeral keys and clear key are also used for entering coordinate values defining the area of partial copying of an original placed on the original carriage 2-29.

A copy start button 16-10 is actuated when starting a recording operation.

A copy stop button 16-11 stops the recording operation after the completion of a recording cycle in progress.

In the case of recording information from the external apparatus, the signal PRNTEB permits the signal output from the external apparatus to continue after the completion of recording operation of a cycle which is under way when the copy stop button 16-11 is actuated. In such a case, if a power switch (not shown) is not turned off, the recording operation of the information from the external apparatus is re-started after 5 minutes. In this manner the recording of the remaining information from the external apparatus can be securely executed.

Coordinate indicators 16-12, 16-13 are used for indicating an area entered in case of copying only a part of the original in the original copying mode.

Figures 1, 16:
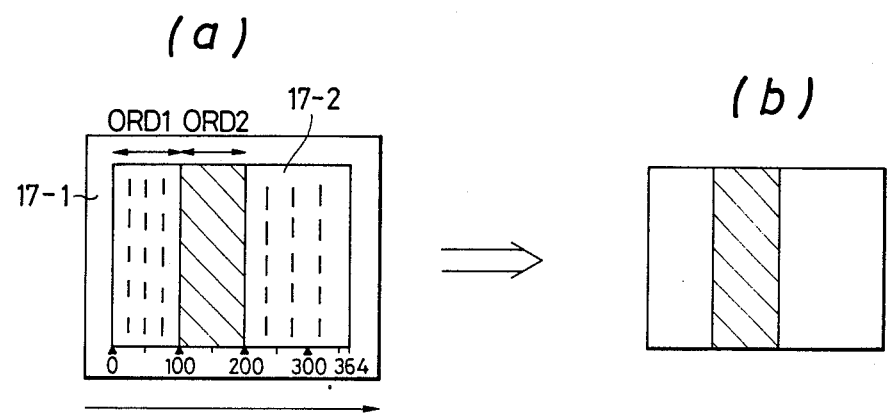
Figures 2, 16:
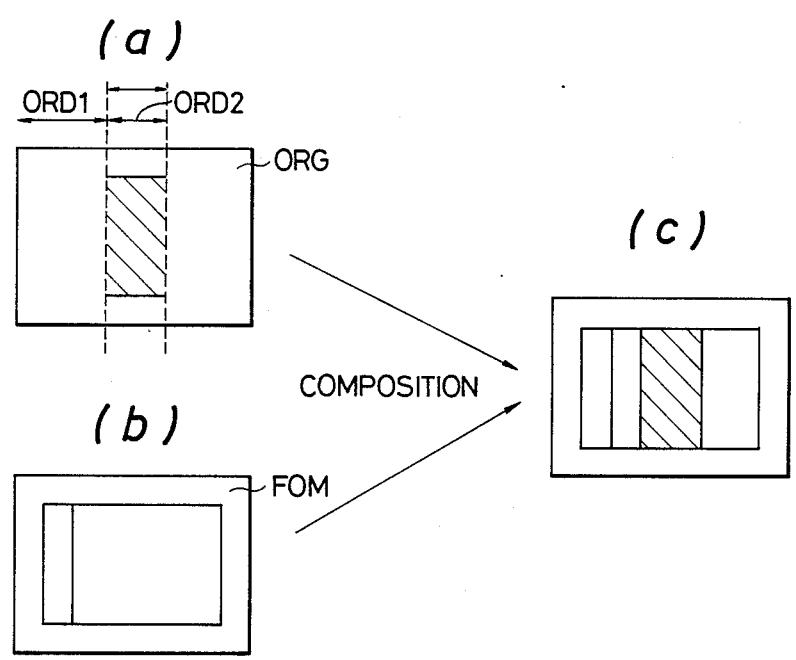

FIGS. 16-1(a) and (b) show an example of a partial copying of the original, wherein an original carriage 17-1, as shown in FIG. 16-1(a), corresponding to 2-29 in FIG. 1, is provided, on a side along the scanning direction of the optical system (2-20, 2-21, 2-22 in FIG. 1), with a scale graduated in millimeters from 0 to 364, and an original 17-2 is placed on the carriage. In a case of copying only the harched area of the original 17-2 as shown in FIG. 16-1(b), the latent image transfer to the insulating drum 2-1 is conducted by activating the charger (D) 2-10 only during a period corresponding to this hatched area. As an example, the hatched area in FIG. 16-1(a) starts at "100" in the scale of the original carriage 17-1, which is taken as a value ORD1. This hatched area ends at "200" so that the length from the start point to the end point is 200−100=100. In such a case the operation unit shown in FIG. 15(b) is actuated in the following manner.

A key 16-14 is used for entering the above-mentioned coordinate ORD1, and, upon actuation thereof, a lamp in the key 16-14 is lighted and the indicator 16-12 flashes the underline marks "—". *In this state the coordinate value can be entered by the numeral keys 16-9, and, upon entry of a figure* "100", the indicator 16-12 flashes thus entered figure the "100". Then an entry key 16-16 is actuated whereby the indicator 16-12 performs static display and the figure "100" is entered as the coordinate ORD1 into the CPU 14-14. The lamp in the key 16-14 is turned off. The entered coordinate figure can be cancelled by actuating the key 16-14 instead of the entry key 16-16 whereby the entered figure is cancelled and the lamp in the key 16-14 is turned off. Then a key 16-15 is operated in a similar manner, and the coordinate values ORD1, ORD2 are entered in this manner. The area of the original corresponds one-to-one to the area on the screen drum 2-2. The CPU 14-14 converts the entered coordinate values into the rotation angle of the screen drum 2-2 and into the time corresponding to the rotation angle, and turns on and off the charger (D) 2-10 according to this time, whereby the latent image on the screen drum 2-2 corresponding to the designated area on the original is transferred onto the insulating drum 2-1.

An image recording as shown in FIGS. 16-2(a), (b), and (c) can be achieved through the above-described procedure. FIG. 16-2 Letter (a) indicates an original ORG of which a hatched area is to be extracted for copying. FIG. 16-2 Letter (b) is a data format FOM stored in the external apparatus 14-10, and a synthesized record represented in FIG. 16-2(c) can be easily obtained by fitting the hatched area of the original ORG into the data format FOM.

In FIG. 15(b), mode selecting switches 16-17, 16-18, and 16-19 are respectively provided lamps therein for indicating the selected mode. Each of the switches, when once actuated, selects the corresponding mode and indicates this mode by the lamp therein, and, when actuated again, cancels the mode and turns off the lamp.

The apparatus of the present embodiment is provided with the following modes. In the following description a copy obtained by scanning an original will be called an "analog copy", while a copy obtained by the multi-stylus head according to information from the external apparatus will be called a "digital copy", and a copy obtained by the combination of the two will be called an "overlay". The following modes will be explained in the combination of an analog copy and a digital copy, but some modes are available also for a combination of digital copies or a combination of analog copies. Also some of the digital copying modes may be achieved by other digital recording devices than the multi-stylus head:

(1) Normal mode (when D-key 16-17, A-key 16-18 and OL-key 16-19 are not selected):

In this mode, an analog copying or a digital copying can be independently carried out. An analog copying cycle may be interrupted to accept a digital copying cycle.

More specifically, when an analog copying cycle is interrupted, the step of latent image transfer by the charger D 2-10 in FIG. 1 is prohibited, then a digital copying cycle is conducted by the multi-stylus head, and the interrupted latent image transfer step is re-started to continue the analog copying operation after the digital copying cycle is completed.

In this state the D-key 16-17 shown in FIG. 15(*b*) is lighted to indicate that a digital copying by interruption procedure is under way.

During the interruption procedure, the set copy number indicator 16-7 indicates a copy number designated by the external apparatus 14-10, and the copy count indicator 16-8 counts up anew from "1" to this copy number.

After the completion of the digital copying operation, the indicator 16-7 revives the set copy number of the analog copying prior to the interruption, and the copy count indicator 16-8 counts upwards from the state prior to the interruption when the analog copying operation is re-started.

Also when a digital copying operation is conducted in the normal mode, a setting of a copy number for the analog copying and the latent image formation on the screen drum 2-2 by scanning an original may be achieved without interrupting the digital copying operation. An actuation of the clear key 16-9 during a digital copying operation resets the indicators 16-7, 16-8 respectively to "001" and "000", and a set copy number for the analog copying is entered by the numeral keys and is displayed by the indicator 16-7. Upon subsequent actuation of the copy start button 16-10 the original is optically scanned to form a primary latent image on the screen drum 2-2. The digital copying operation is continued during the above-described procedure.

After the latent image formation on the screen drum 2-2, the indicators 16-7, 16-8 revive the set copy number and the copy count for the digital copying operation. After completion of the digital copying operation, the analog copying operation can be started from the latent image transfer step to the insulating drum 2-1 since the primary latent image is already formed on the screen drum 2-2. At the same time the indicator 16-7 displays the already entered set copy number for the analog copying, and the copy count indicator 16-8 starts counting up from "1".

Even when the clear key 16-9 is actuated during a digital copying operation, the set copy number and the copy count for the digital copying are restored on the indicators 16-7, 16-8 unless the copy start button 16-10 is actuated within a determined time.

(2) Analog copy mode (when A-key 16-18 is selected):

In this mode the signal BUSY shown in FIG. 13 is released to the external apparatus 14-10, thus prohibiting digital copying thereby.

Upon actuation of the A-key 16-18 during a digital copying operation under the normal mode, the copying operation is interrupted and the signal BUSY is supplied to the external apparatus 14-10. However, upon re-actuation of the A-key 16-18, the prohibition is cancelled and the digital copying operation is re-started.

Thus in the case of interrupting a digital copying operation for an analog copying operation, and if such interruption later proves to be erroneous or unnecessary, the interrupted digital copying operation can be conveniently re-started. The A-key 16-18 selects the analog copy mode, in which the copy number setting and the copy starting can be carried out in the same manner as explained in the case (1). In case these steps are not executed within a determined time, the digital copying operation before interruption is re-started.

When a synthesized copying is conducted under the overlay mode by the actuation of the overlay (OL) key 16-19, the actuation of the A-key 16-18 forbids the digital copying and only allows the analog copying during the period of the analog copy mode selected by the A-key, and the synthesized copying under the overlay mode is re-started when the selection by the A-key is cancelled.

(3) Digital copy mode (when K-key 16-17 is selected):

In this mode the analog copying is prohibited unless the D-key 16-17 is actuated again to cancel the digital copy mode. Upon such cancellation the aforementioned normal mode is selected. In the digital copy mode the apparatus awaits the print start signal PRNTST from the external apparatus, and the sheet feeding is initiated by the entry of the print start signal. Thereafter the digital copying operation is conducted by feeding sheets at a predetermined interval according to the timing determined by the apparatus and by releasing the print enable signal PRNTEB.

When a synthesized copying is conducted by the actuation of the OL-key 16-19, the actuation of the D-key 16-17 forbids the latent image transfer from the screen drum 2-2 to the insulating drum 2-1 and allows the digital copying operation only, during the period of the digital copy mode selected by the D-key 16-17. The original overlay mode is restored when the digital copy mode is cancelled by the repeated actuation of the D-key.

(4) Overlay mode (when OL-key 16-19 is selected):

In this mode an analog copying and a digital copying are synthesized.

In this mode, in response to the actuation of the copy start button 16-10, the original is scanned to form a latent image on the screen drum 2-2. In this state the apparatus awaits the entry of the print start signal PRNTST (FIG. 13) from the external apparatus 14-10, starts sheet feeding simultaneously with this signal, and displays, on the set copy number indicator 16-7, the larger of the copy number signal QUTY from the external apparatus 14-10 (FIG. 13) and the set copy number designated by the operation unit [FIG. 15(b)], thus starting the above-mentioned image synthesis. At first the charger (D) 2-10 is activated for latent image transfer from the screen drum 2-2 to the insulating drum 2-1, thus forming a secondary latent image. After a predetermined time the print enable signal PRNTEB is released to the external apparatus 14-10 for synthesizing an image obtained by the multi-stylus head 2-3 with the secondary latent image. Thereafter the synthesized copying is continued by sheet feeding according to the recording time of the apparatus.

When an abnormality such as sheet jamming in the course of a recording operation for external information under the normal mode (1) or the digital copy mode, the digital copy mode is automatically adopted after the abnormality is resolved. In this manner the recording of the information from the external apparatus 14-10 is securely conducted.

In this manner the operator can utilize the apparatus effectively by suitably selecting modes according to the condition of installation and the status of utilization.

Also the apparatus enables recording of an image supplied from a different source, by interrupting the recording operation currently under way.

FIG. 17 shows the connection between the operation/display unit 14-7 and the I/O port controller 14-16, wherein like components are represented by like numbers already explained before.

The I/O port controller 14-16 is provided with output ports a-g, L and 1-17; and input ports I1-I4. In order to reduce the number of ports, display units 18-3, 18-1 perform dynamic drive, and a switch 18-2 performs dynamic scanning. More specifically, ports 1-12 for 7-segment light-emitting diodes (LED) of indicators 16-7, 16-8, 16-12 and 16-13 are activated in successive manner, and dynamic drive is achieved by releasing, through the ports a-g, data to be displayed in a 7-segment LED activated in this manner. Also the indicator 18-1 displays the on/off state of the ports 1-11 when the port L is activated. The state of switches 18-2 is detected by activating the output ports 13-19 in succession and inspecting the input levels to the input ports I1-I4.

Now reference is made to FIGS. 18-24 for explaining the various modes of the present embodiment.

Figure 18:
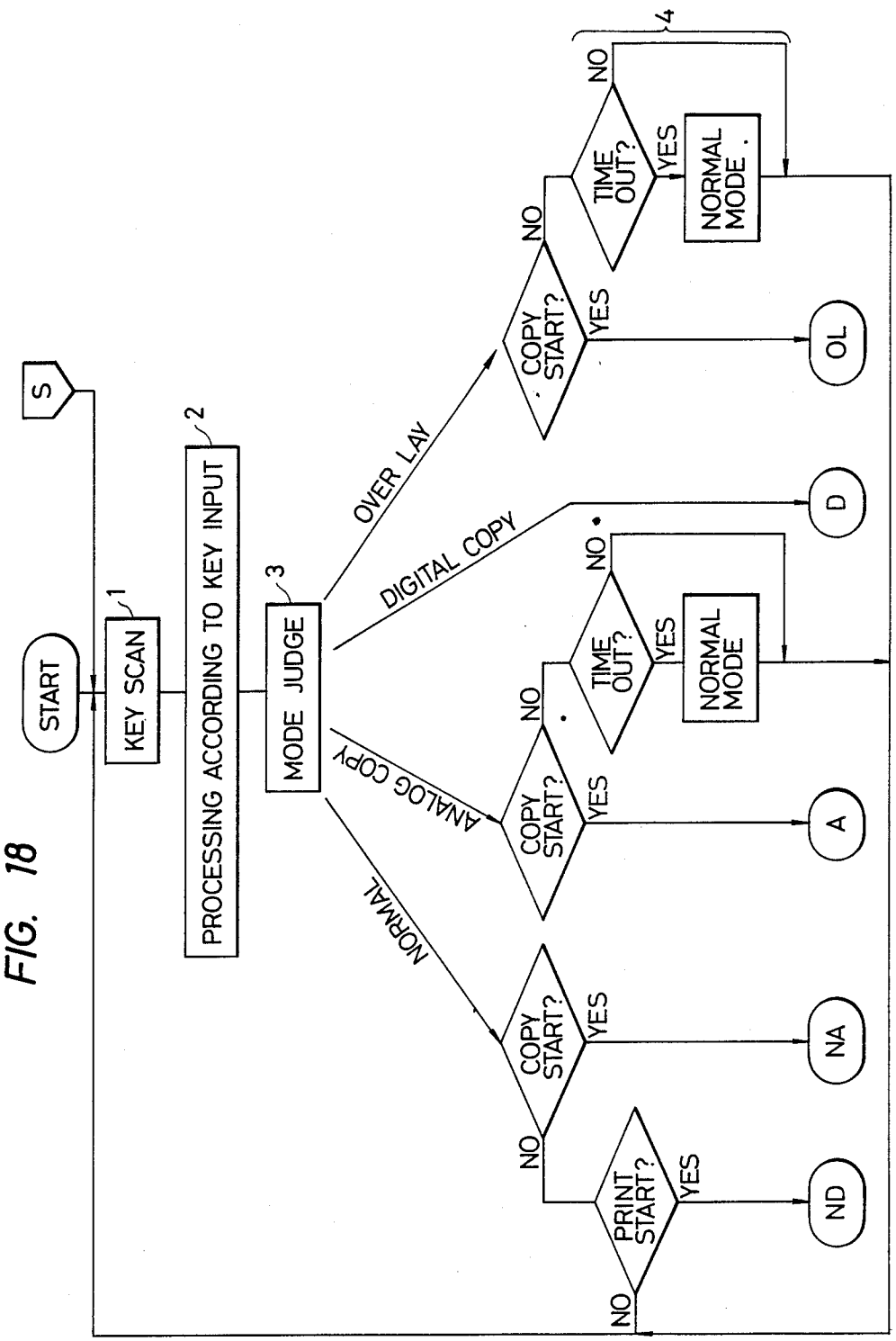

FIG. 18 shows a flow chart indicating the procedure of mode identification. At first a step 1 executes the aforementioned dynamic key scanning, and a step 2 executes a process according to the actuated key, for example, the display of an entered figure on the set copy number indicator 16-7 if the numeral keys 16-9 are actuated for the copy number setting. If a mode key 16-17, 16-18 or 16-19 is actuated, a step 3 identifies the selected mode.

The present apparatus has four modes as explained before, and the program jumps to a corresponding routine according to the mode identification in the step 3. In a step 4, in the presence of a copy start command in each mode or a copy start command from the external apparatus, the program jumps to a corresponding mode. In the absence of such a command the program returns to the key scanning procedure in the step 1.

The procedure in each mode after mode identification is as follows. In response to a copy start command in the normal mode or a copy start command from the external apparatus, a normal mode copying operation is started. In the analog copy mode, an analog copying operation is started when the copy start button 16-10 is actuated within a predetermined time after the analog mode identification. In the absence of such actuation the program returns to the normal copy mode and effects the key scanning procedure in the step 1. In the digital copy mode, a waiting state is maintained until an external print start signal is entered. In the overlay mode, in a similar manner as in the analog copy mode, the overlay copying operation is started if the copy start button 16-10 is actuated within a predetermined time but the program returns to the normal mode in the absence of such actuation.

In the following each mode will be explained in more detail.

(1) Normal mode

FIG. 16 shows a flow chart of the procedure in the normal mode, to be executed when an analog copy start command is released by the actuation of the copy start button 16-10 in the operation unit 14-7. In this state the copy number is already set by the key scanning procedure in the step 1 shown in FIG. 18 and displayed on the set copy number indicator 16-7 and the copy count indicator 16-8 indicates "0". At first a step 11 executes the original scanning, and a step 12 executes latent image formation on the screen drum 2-2. If a step 13 identifies the absence of a print request PRNTST from the external apparatus 14-10, the program proceeds to a step 14 for effecting an analog copying operation. The step 14 effects the latent image transfer from the screen drum 2-2 to the insulating drum 2-1 and enters a retention state. If the operation unit designates an area for latent image transfer as already explained in relation to FIGS. 16-1 and 16-2, the charger (D) 2-10 is activated corresponding to the area. Then a step 15 executes sheet feeding, and a step 16 steps up the copy count. A step 17 executes the steps of image transfer, image fixing and cleaning. If a step 18 identifies that the number of copying cycles has not reached the set copy number, the program returns to the step 13 while the processes of the step 17 are conducted, and the above-described analog copying operation is repeated until the number reaches the set copy number. Thereafter the program returns to the key scanning procedure of the step 1.

In the presence of a print request signal PRNTST for digital copying from the external apparatus in the course of an analog copying operation, priority is given to such digital copying. Upon detection of a signal in the step 13, a step 19 forbids the latent image transfer after the completion of the latent image transfer step of the analog copying operation currently under way, and a step 20 receives a print number signal QUTY simultaneously supplied with the print start signal PRNTST from the external apparatus and displays this number on the set copy number indicator 16-8. Then a step 21 flashes the D-key 16-17 of the operation unit in order to indicate an interruption of digital copying from the external apparatus 14-10. A step 22 executes sheet feeding, then a step 23 steps up the copy count, and a step 24 executes a waiting step until an appropriate surface area of the insulating drum 2-1 reaches the position of the multi-stylus head 2-3. During this waiting step the insulating drum 2-1 is uniformly charged by the charger (G) 2-11 shown in FIG. 1. After the waiting step of a predetermined period, a step 25 supplies the print enable signal PRNTEB (FIG. 13) to the external apparatus for a period corresponding to an image of a page. During this period the external apparatus performs the latent image formation for a digital image through the multi-stylus head. A step 26 executes the copying operation as explained before, and the steps 22 to 27 are repeated until the set copy number is reached. Upon completion of the copying operations a step 28 restores the set copy number and the copy count of the interrupted analog copying operation at the timing of the interruption, and terminates the flashing of the D-key 16-17.

In this manner priority is given to the recording of the information from the external apparatus since the analog copying operation of an original can be re-started immediately after interruption as long as the latent image stored on the screen drum 2-2 remains unerased.

Figure 20:
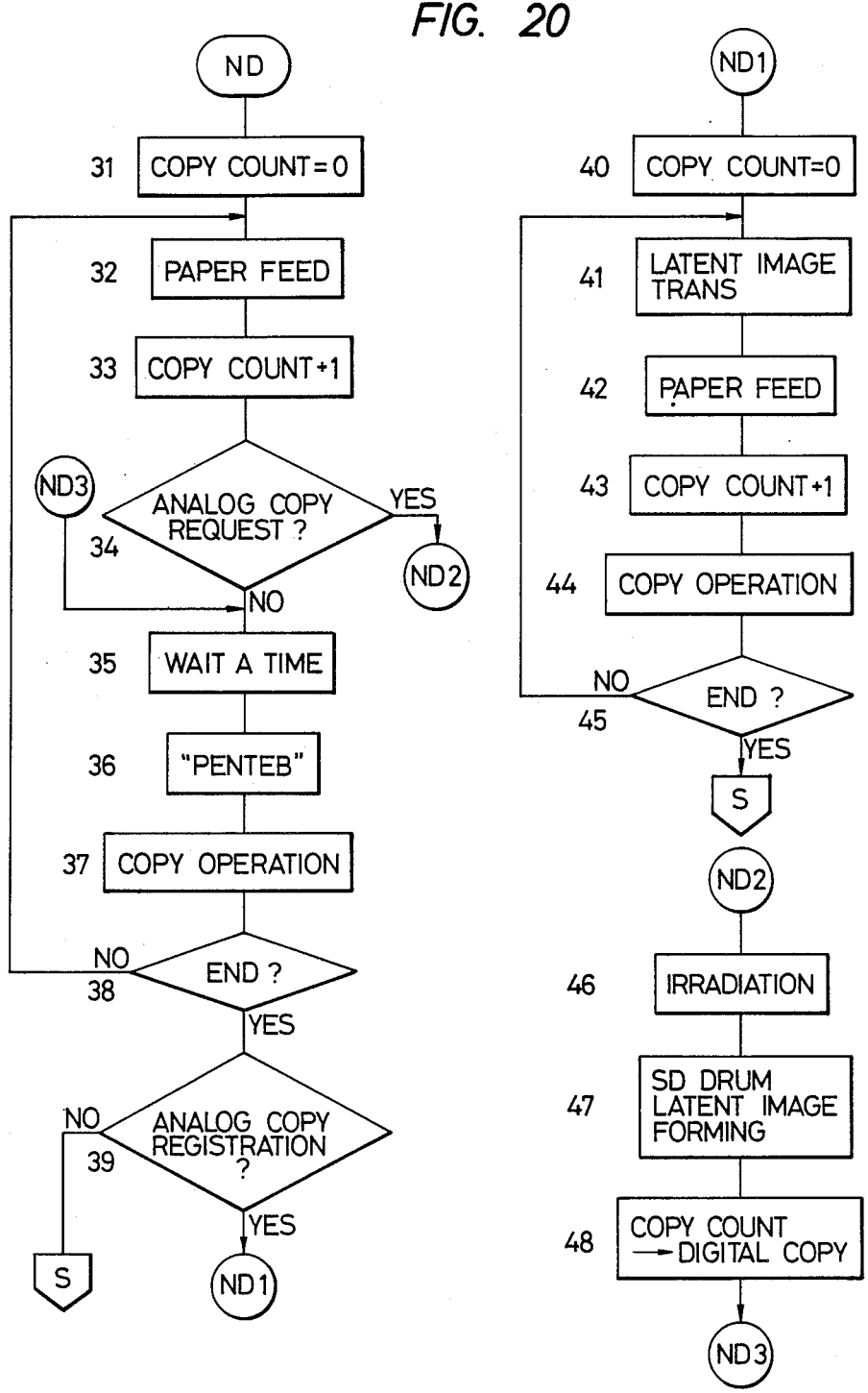

FIG. 20 shows a flow chart of the procedure to be executed when the digital copying operation is started in response to a print start signal from the external apparatus under the normal mode. At first a step 31 displays, on the set copy number indicator 16-7, the copy number signal QUTY supplied simultaneously with the print start signal PRNTST from the external apparatus, and shifts the copy count indicator 16-8 to "0". Then a step 32 executes sheet feeding. The digital copying operation is continued if a step 34 identifies the absence of an analog copy request, by the actuation of the clear key followed by the copy number setting with the numeral keys 16-9 and the actuation of the copy start button 16-10. A step 35 executes a waiting step of a predetermined period for achieving an appropriate timing of the recording, during which the insulating drum is uniformly charged, and a step 36 generates the print enable signal PRNTEB for a period corresponding to a page, thereby enabling the latent image formation with the multi-stylus head. Then a step 37 executes the copying cycle on a plain paper, and the steps 32 to 38 are repeated until the set copy number is reached.

If the aforementioned analog copy request is entered during the above-described procedure, the desired analog copy number entered anew by the numeral keys 16-9 is displayed on the set copy number indicator 16-7 and the copy count indicator 16-8 displays "0". In this case a step 46 executes the original scanning, and a step 47 executes the latent image formation on the screen drum 2-2. Thereafter a step 48 restores the set copy number and the copy count of the digital copying operation currently under way.

During the above-explained steps, the digital copying operation is conducted without interruption and in parallel manner by the steps 32 to 38.

If the step 38 identifies the completion of digital copying cycles corresponding to the set copy number, the program proceeds to a step 40 if a latent image is already stored on the screen drum 2-2 by an original scanning operation, or returns to the key scanning procedure in the step 1. The step 40 displays the already set analog copy number on the set copy number indicator 16-7 and shifts the copy count indicator 16-8 to "0". A step 41 starts the latent image transfer, then a step 42 executes sheet feeding and a step 43 steps up the copy count. If an area for latent image transfer is designated as explained before, the latent image transfer is conducted only for such area. A step 44 executes copying procedure on a plain paper, and the steps 41–45 are repeated until the set copy number is reached. After the completion of the analog copying operation the program returns to the key scanning procedure of the step 1.

As explained above, when an analog copying operation is interrupted by a digital copying operation, the priority is given to the digital copying and the interrupted analog copying is automatically re-started after the completion of the digital copying. At the re-start the latent image transfer from the screen drum 2-2 to the insulating drum 2-1 can be started immediately and the original scanning is omitted. Also in the course of the digital copying, an original scanning for a next analog copying is conducted to store a latent image on the screen drum 2-2, so that the analog copying operation can be started, without the original scanning step, immediately after the completion of the digital copying. In this manner it is advantageously possible to reduce the time required for copying.

(2) Analog copy mode

Figure 21B:
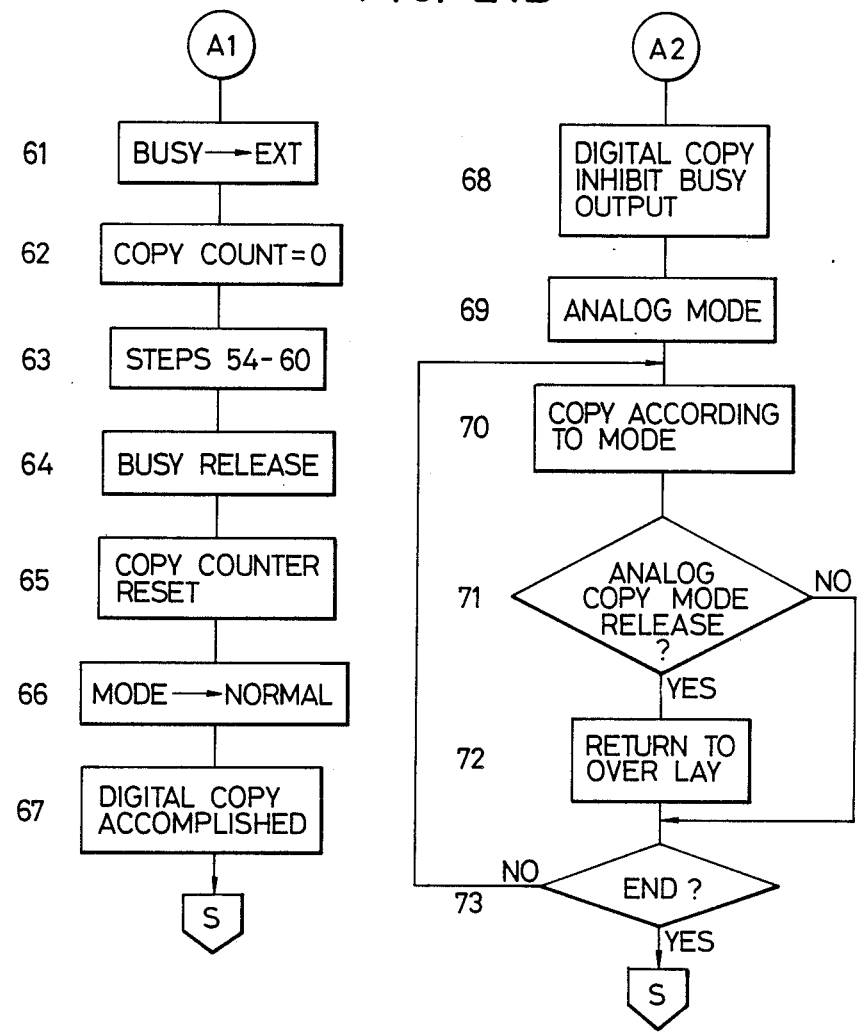

FIG. 21, which includes FIGS. 21A and 21B, shows a flow chart of the procedure to be executed when the copy start button 16-10 is actuated under the analog copy mode. Steps 51 through 60 are depicted in FIG. 21A while steps 61 through 73 are depicted in FIG. 21B.

The analog copy mode may be selected either when a digital copying operation is conducted under the normal mode, or when a synthesized copying operation is conducted under the overlay mode.

(2-1) When the copying operation is not in progress in the normal mode:

In this case the program proceeds through steps 51 and 52 as shown in FIG. 21A, and a step 53 is then executed to supply the signal BUSY to the external apparatus, thus prohibiting the digital copying. A step 54 executes the optical original scanning, and a step 55 executes latent image formation on the screen drum 2-2. If an area is designated the latent image transfer is conducted only in this area. Steps 56 to 59 execute retention copying by latent image transfer from the screen drum 2-2 to the insulating drum 2-1. The step 57 executes sheet feeding, and the step 58 steps up the copy count. The step 59 executes the image transfer, image fixing and cleaning, and the steps 56 to 59 are repeated until the set copy number is reached. After the completion of the desired analog copying operation, the program returns to the key scanning procedure in the step 1.

(2-2) When a digital copying operation for the information from the external apparatus is already in progress under the normal mode:

In this case the program jumps from the step 51 to a step 61 shown in FIG. 21B in which the signal BUSY is released to the external apparatus to interrupt the digital copying operation. Thereafter the print enable signal PRNTEB is not released until the signal BUSY is cancelled.

At a step 62 the set copy number for the analog copying is already displayed and the copy count indicator 16-8 displays "0". Then a step 63 executes the analog copying operation until the set copy number is reached by means of the aforementioned steps 54 to 60. After the completion of the copying operation, a step 64 cancels the signal BUSY, and a step 66 restores the normal mode. Also a step 65 restores the set copy number and the copy count of the interrupted digital copying, and a step 67 executes the digital copying sequence (a routine composed of steps 85 to 90 shown in FIG. 22) until the set copy number is reached. After the completion of the copying operation, the program returns to the key scanning procedure in the step 1.

(2-3) A synthesized copying operation is already in progress in the overlay mode:

In this case the program jumps, after the steps 51 and 52, to a step 68 shown in FIG. 21B for releasing the signal BUSY to the external apparatus, and a step 69 shifts the apparatus to the analog mode. Thereafter the print enble signal PRNTEB for permitting the copying operation with the multi-stylus head is not released and the copying operation by the latent image transfer from the screen drum 2-2 to the insulating drum 2-1 alone is executed until the analog mode is cancelled. A step 70 executes a copying operation according to the selected mode, namely the operation of the aforementioned steps 56 to 59 in case of the analog mode, or steps 116 to 122 shown in FIG. 23 when the analog mode is cancelled to restore the overlay mode. A step 71 identifies whether the operation unit 14-7 has cancelled the analog copying, and, if affirmative, a step 72 restores the overlay mode and the aforementioned step 70 executes the copying operation in the overlay mode. On the other hand, if the analog mode is not cancelled, the step 72 is skipped and the copying operation in the analog mode is executed until the set copy number is reached. After the completion of the copying operation the program returns to the key scanning procedure of the step 1.

Figure 22:
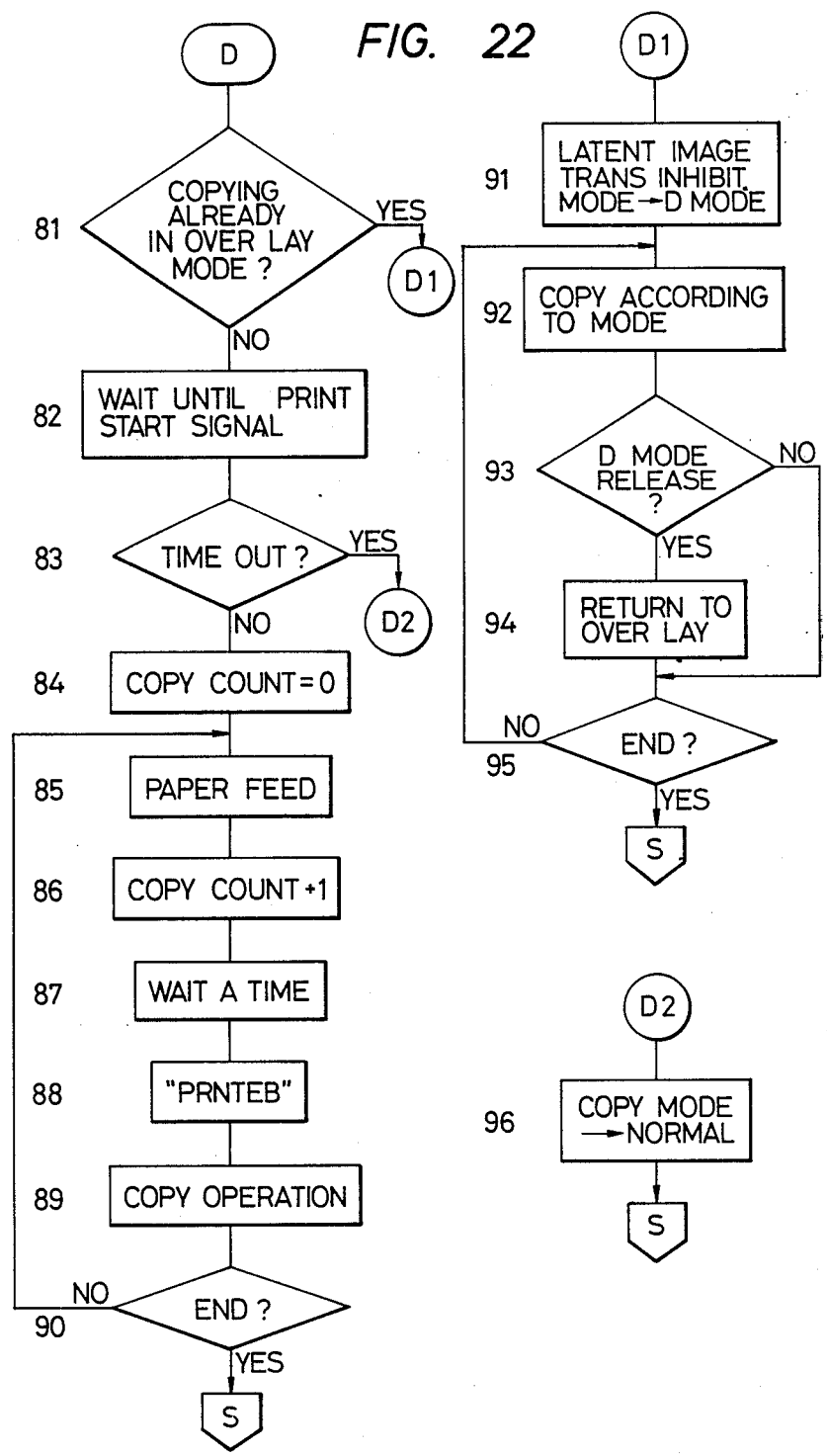

(3) Digital copy mode:

FIG. 22 shows a flow chart when the digital copy mode is selected.

In this case, if the copy operation is not in progress, the apparatus awaits the signal output from the external apparatus. On the other hand, if a synthesized copying operation is conducted in the overlay mode, the analog copying by the latent image transfer from the screen drum 2-2 is prohibited, and the digital copying by the multi-stylus head alone is executed until the digital copy mode is cancelled.

(3-1) When the copying operation is not in progress:

The program proceeds through a step 81 to a step 82 in which the apparatus awaits the print start signal from the external apparatus for a determined period. If the print start signal from the operation unit 14-7 is not supplied within the period, a step 96 restores the normal mode, and the program returns to the key scanning procedure of the step 1.

If the print start signal is received in the step 82, the program proceeds thrugh a step 83 to a step 84 for displaying, on the set copy number indicator 16-7, a number corresponding to the copy number signal QUTY from the external apparatus, and resetting the copy count indicator 16-8. Then a step 85 executes the sheet feeding and a step 86 steps up the copy count. Then a step 87 waits for a predetermined period until the insulating drum 2-1 rotates to a predetermined position, and during this period the insulating drum 2-1 is uniformly charged, positively, by the charger (G) 2-11 shown in FIG. 1. Then a step 88 releases the print enable signal PRNTEB to the external apparatus for the image period of a page, during which the latent image is formed by the multi-stylus head 2-3 on the insulating drum 2-1. A step 89 executes the steps of image transfer, image fixing and cleaning, and the copying operation of the steps 85 to 89 is repeated until the set copy number is reached. After the completion of the copying operation, the program returns to the key scanning procedure of the step 1.

(3-2) When a synthesized copying is already in progress in the overlay mode:

When the overlay mode is identified in the step 81, the program jumps to a step 91 for realizing the digital copy mode by prohibiting the latent image transfer from the screen drum 2-2. Thereafter the recording of digital image from the external apparatus is alone conducted until the digital copy mode is cancelled. Then a step 92 executes a copying operation according to the selected mode, namely the digital copying by the aforementioned routine of the steps 85 to 89 if the digital copy mode is not cancelled, or a copying operation by the overlay mode by steps 116 to 122 shown in FIG. 23 if the digital copy mode is cancelled. A step 93 identifies, in each copying cycle, whether the digital copy mode is cancelled, and, if it is cancelled, a step 94 restores the overlay mode to effect the recording operation in this mode until the set copy number is reached. On the other hand, if the digital copy mode is not cancelled in the step 93, the step 94 is skipped and the recording operation is conducted by the steps 92 to 95 as explained before. When the step 95 identifies that the set copy number has been reached, the program returns to the key scanning procedure of the step 1.

Figure 23:
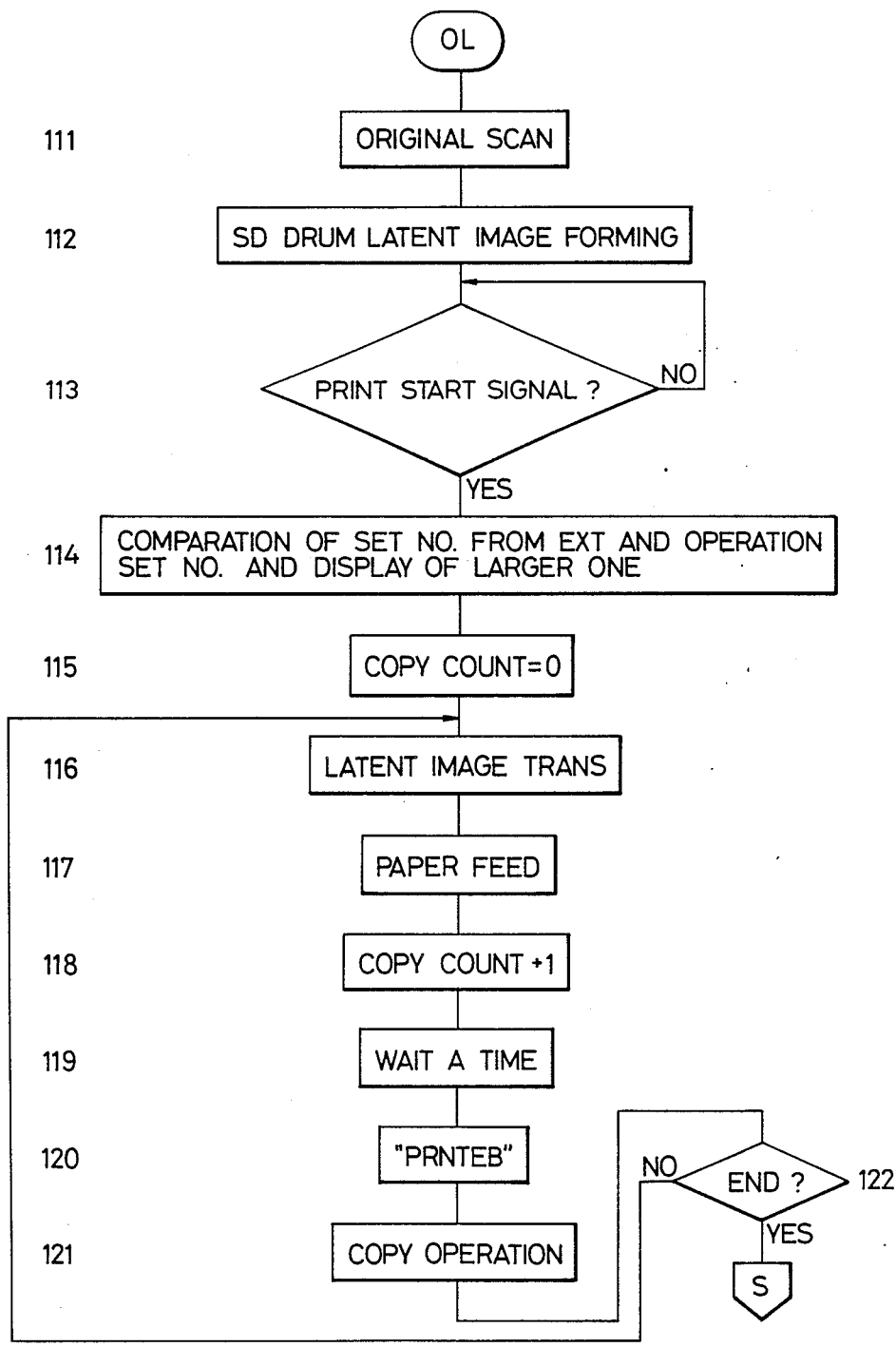

(4) Overlay copy mode:

FIG. 23 shows a flow chart when the copy start key is actuated in the overlay mode. When the program reaches a step 101 in FIG. 23, the overlay mode is already selected by the operation unit, and the copy number is already set. At first a step 111 executes the optical original scanning, then a step 112 performs the formation of a latent image on the screen drum 2-2 corresponding to an original image, and a step 113 executes a waiting step until the print start signal PRNTST is supplied from the external apparatus. In response to the print start signal PRNTST, a step 114 compares the copy number already set by the operation unit with the set copy number QUTY supplied from the external apparatus and displays the larger as the set copy number. Then a step 115 resets the display of the copy count indicator 16-8. Subsequently a step 116 initiates the latent image transfer from the screen drum 2-2 to the insulating drum 2-1, a step 117 effects the sheet feeding at a correct timing, and a step 118 steps up the copy count. If an area is designated as shown in FIG. 16-2, the latent image transfer is executed only in this area. A step 119 performs a waiting step for a predetermined period until the latent image transferred onto the insulating drum 2-1 in the step 116 reaches the position of the multi-stylus head 2-3. Even when an area for latent image transfer is designated, a waiting step is executed until a latent image portion on the insulating drum 2-1 corresponding to the leading end of the latent image on the screen drum 2-2 reaches the position of the multi-stylus head 2-3. A step 120 releases the print enable signal PRNTEB to the external apparatus for the image period of a page, during which the latent image formed by the multi-stylus head 2-3 is synthesized with the latent image formed on the insulating drum 2-1 by the latent image transfer from the screen drum 2-2. A step 121 executes the steps of image transfer, image fixing etc., and the recording operation of the steps 116 to 122 is conducted until the set copy number is reached. After the completion of the recording operation the program returns to the key scanning procedure of the step 1.

As explained before, the copy number set by the operation unit and the copy number entered from the external apparatus are compared in the step 114, and the copying operation is conducted for a number of times corresponding to the larger of the two, so that the number of obtained copies corresponds to the instruction from the external apparatus even when the set copy number is smaller than the copy number instructed by the external apparatus. Also when the copy number is not entered by the external apparatus, namely when the signal QUTY shown in FIG. 13 is open, the operator can arbitrarily select the copy number by the operation unit 14-7.

In the present embodiment the function of the apparatus is stopped when the stop key 16-11 shown in FIG. 15(b) is actuated or when an abnormality such as sheet jamming occurs. However the function of the control unit shown in FIG. 13 is not stopped in such case. In response to the actuation of the stop key 16-11, the copying operation is stopped even if it is already in progress, and the control unit is shifted to the normal mode and stops the function until the next key entry. Also in case of abnormality, the control unit assumes the normal mode after the abnormality is resolved, and interrupts the function as explained above. The control procedure is however different only when a digital copy alone is conducted according to the image information from the external apparatus.

Figure 24:
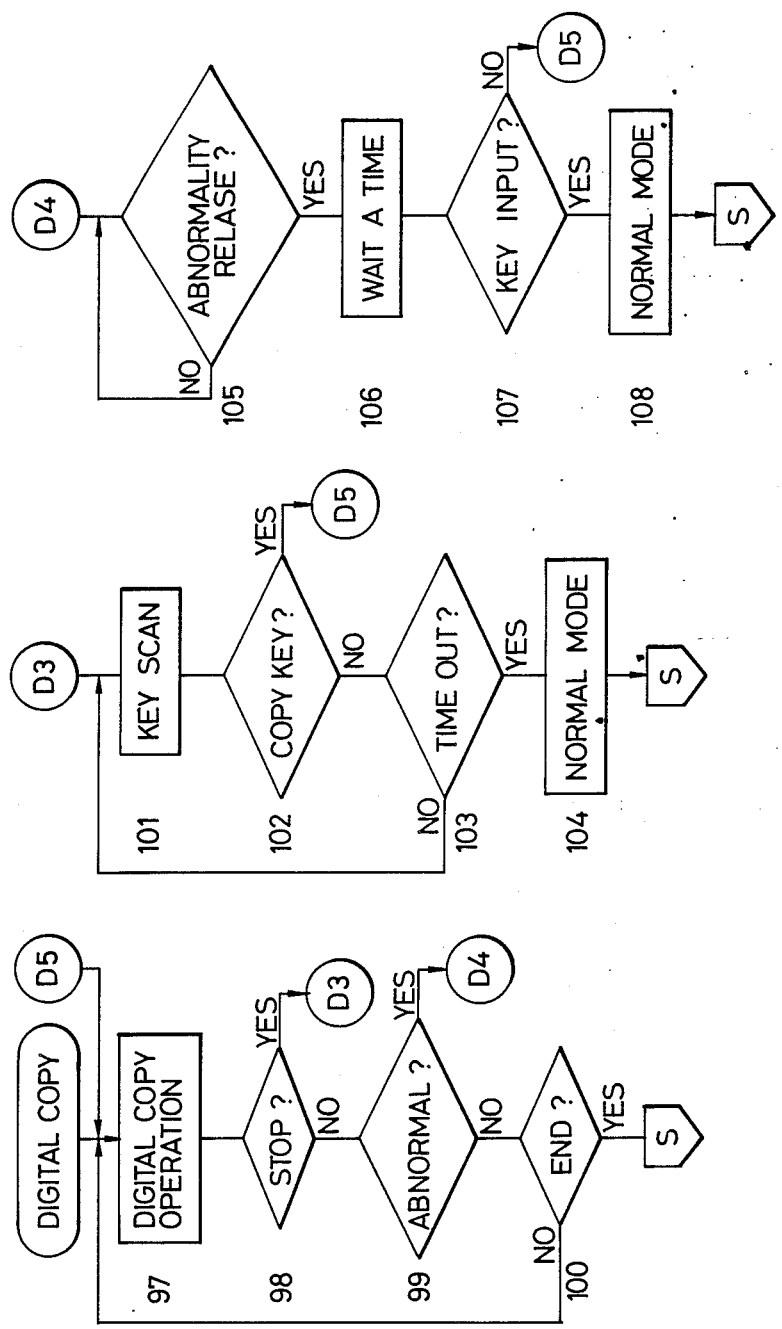

Now reference is made to FIG. 24 for explaining the control in such a case. A step 97 indicates a digital copying in the normal mode (FIG. 20) or a digital copying in the digital copy mode (FIG. 22), corresponding to the steps 85 to 90 shown in FIG. 22.

A step 98 identifies the entry of the stop key 16-11, and, if it is actuated, a step 101 initiates the key scanning procedure. It corresponds to the key scanning routine shown in FIG. 18, of which flow chart is shown in FIG. 24. In case the copy button 16-10 shown in FIG. 16 is actuated at first in steps 102, 103, the program returns to the step 97 to await the data output from the external apparatus. In this state, the external apparatus is also in the waiting state since the print enable signal is also not released. If a determined period, 5 minutes in the present embodiment, expires in a step 103, a step 104 restores the normal mode and the program returns to the key scanning procedure in the step 1. When an abnormality is identified in a step 99, the program jumps to a step 105 to await until the abnormality is resolved. After resolving a step 106 executes a waiting step for a determined period, 1 minute in the present embodiment. During this period the key scanning routine shown in FIG. 18 is executed, and, in response to any key entry from the operation unit shown in FIG. 15(b), steps 107, 108 are executed to restore the normal mode, and the program returns to the key scanning procedure of the step 1. On the other hand, in the absence of key entry within a predetermined period, the program returns to the step 97 to re-start the digital copying. In such a case the external apparatus is maintained in the waiting state as explained before.

In the foregoing four modes of the present apparatus, the key scanning routine shown in FIG. 18 is always executed during the waiting step so that parallel processing is rendered possible.

As explained in the foregoing, the apparatus of the present invention is capable of efficiently achieving four modes to record an original image and output signals of an external apparatus such as a large computer independently or in a synthesized image.

In the foregoing embodiment the image formation according to externally supplied information is conducted with multiple styli, but certain parts of the present invention are achievable by other methods.

What is claimed is:

1. An image forming apparatus comprising:
   means for converting an original image into an electrostatic charge and for maintaining the electrostatic charge;
   first forming means for forming a first electrostatic latent image on a recording medium according to the electrostatic charge maintained by said converting means; and
   second forming means for forming a second electrostatic latent image on said recording medium according to an input image signal
   wherein, in response to a demand for latent image formation by said second forming means during the latent image formation by said first forming means, the function of said first forming means is interrupted and said second forming means is activated, and, the latent image formation by said first forming means, which is performed according to the electrostatic charge maintained by said converting means before the interruption, is started again after the completion of the function of said second forming means.

2. An image forming apparatus according to claim 1, wherein said recording medium includes a dielectric layer for holding the electrostatic charge thereon.

3. An image forming apparatus according to claim 1, wherein said converting means comprises a member adapted to maintain the charge distribution corresponding to the light reflected from an original.

4. An image forming apparatus according to claim 1, wherein said second forming means is adapted to form the latent image by a discharge between said second forming means and said recording medium.

5. An image forming apparatus according to claim 1, further comprising developing means for developing the latent image formed on said recording medium into a visible image, and means for transferring a visible image thus obtained onto a recording material.

6. An image forming apparatus according to claim 1, wherein said first forming means is operable to form a plurality of the first electrostatic latent image in accordance with the electrostatic charge maintained by said converting means.

7. An image forming apparatus according to claim 1, wherein said second forming means is operable to form the second electrostatic latent image in accordance with an input image signal entered from an external device.

8. An image forming apparatus according to claim 1, wherein said converting means includes means for scanning an original image.

9. An image forming apparatus according to claim 1, wherein said converting means includes means for transferring the electrostatic charge maintained by said member to said recording medium.

10. An image forming apparatus comprising:
    first output means for outputting first image information;
    second output means for outputting second image information;
    image forming means for forming an overlaid image of first and second images on a recording medium, according to the first and second image information from said first and second output means;
    indication means for indicating a desired one of the first and second images; and
    means, in response to the indication of said indication means, for interrupting image formation according to one of said first and second image information and permitting image formation according to another image information during a period of time when image formation of said overlaid image is being performed by said image forming means so as to form a desired one of the first and second images on the recording medium.

11. An image forming apparatus according to claim 10, wherein the image formation according to said first or second image information if prohibited is re-startable.

12. An image forming apparatus according to claim 10, wherein said image forming means comprises first image forming means for image formation according to said first image information, and second image forming means for image formation according to said second image information.

13. An image forming apparatus according to claim 10, wherein said first output means outputs the first image information indicative of an original image.

14. An image forming apparatus according to claim 10, wherein said second output means outputs an image information entered from an external device.

15. An image forming apparatus according to claim 10, wherein said image forming means is operable to form an electrostatic latent image on said recording medium.

16. An image forming apparatus according to claim 15, further comprising developing means for developing the latent image formed on said recording medium into a visible image, and means for transferring a visible image thus obtained onto a recording material.

17. An image forming apparatus comprising:
first forming means for forming a first image on a first recording medium;
means for transferring the first image formed on said first recording medium onto a second recording medium;
second forming means for forming a second image on said second recording medium;
means for manually inputting coordinate data to designate an arbitrary area to be extracted from the first image; and
means for controlling an operation period of time of said transferring means to transfer an image on the designated arbitrary area of the first image formed on said first recording medium onto said second recording medium in accordance with the coordinate data inputted by said inputting means so as to form a composite image consisting of the second image and the image corresponding to the arbitrarily extracted area of the first image on said second recording medium.

18. An image forming apparatus according to claim 17, wherein said first forming means is adapted to form an image corresponding to the density of an original image on said first recording medium.

19. An image forming apparatus according to claim 17, wherein said first forming means is operable to convert an original image into an electrostatic charge and to maintain it on the first recording medium, and said transferring means transfers the electrostatic charge to said second recording medium.

20. An image forming apparatus according to claim 17, wherein said second forming means is operable to form on a second recording medium an electrostatic latent image according to an input signal entered from an external device.

21. An image forming apparatus comprising:
first output means for outputting first image information and information indicating a number of recordings to be made of said first image information;
second output means for outputting second image information and information indicating a number of recordings to be made of said second image information; and
recording means for forming first and second images on a same recording media according to said first and second image information;
wherein said recording means performs the recording operations for the larger indicated number, in case the numbers of recordings instructed by the information from said first and second output means are mutually different.

22. An image forming apparatus according to clasim 21, further comprising means for displaying the number of recording operations to be performed by said recording means.

23. An image forming apparatus according to claim 21, wherein said first output means outputs the first image information indicative of an original image.

24. An image forming apparatus according to claim 21, wherein said second output means outputs an image information entered from an external device.

25. An image forming apparatus according to claim 21, wherein said recording means forms an electrostatic latent image on said recording medium.

26. An image forming apparatus according to claim 25, further comprising developing means for developing the latent image formed on said recording medium into a visible image, and means for transferring a visible image thus obtained onto a recording material.

* * * * *

UNITED STATES PATENT AND TRADEMARK OFFICE
CERTIFICATE OF CORRECTION

PATENT NO. : 4,884,104

DATED : November 28, 1989

INVENTOR(S) : TADASHI YOSHIDA

It is certified that error appears in the above-identified patent and that said Letters Patent is hereby corrected as shown below:

TITLE PAGE:
AT [63] RELATED U.S. APPLICATION DATA

"Ser. No. 849,421," should read --Ser. No 549,421,--.

COLUMN 1

Line 7, "continuatin" should read --continuation--.
Line 63, "the" should read --in the--.

COLUMN 2

Line 25, "dtermines" should read --determines--.
Line 45, "form" should read --from--.

COLUMN 4

Line 32, "21," should read --20, Figs. 21,--.

COLUMN 7

Line 21, "state" should read --stage--.
Line 49, "like but" should read --like, but--.

COLUMN 8

Line 1, "frond end" should read --front end-- and "the" (second occurrence) should be deleted.

UNITED STATES PATENT AND TRADEMARK OFFICE
CERTIFICATE OF CORRECTION

PATENT NO. : 4,884,104
DATED : November 28, 1989
INVENTOR(S) : TADASHI YOSHIDA

It is certified that error appears in the above-identified patent and that said Letters Patent is hereby corrected as shown below:

COLUMN 9

Line 16, "line 11 11-13," should read --line 11-13,--.

COLUMN 10

Line 13, "signsal" should read --signal--.
Line 35, "memory 11-15-1" should read --memory 11-5-1--.

COLUMN 11

Line 40, "buffer memory 11-15-1." should read
--buffer memory 11-5-1.--.

COLUMN 13

Line 62, "when data" should read --when the data--.

COLUMN 14

Line 44, "showsn" should read --shown--.

COLUMN 15

Line 50 "indicated 16-8" should read --indicator 16-8--.

COLUMN 16

Line 22, "harched" should read --hatched--.
Line 38, "flashes thus" should read --flashes the thus--
and "the" should be deleted.

UNITED STATES PATENT AND TRADEMARK OFFICE
CERTIFICATE OF CORRECTION

PATENT NO. : 4,884,104
DATED : November 28, 1989
INVENTOR(S) : TADASHI YOSHIDA

Page 3 of 3

It is certified that error appears in the above-identified patent and that said Letters Patent is hereby corrected as shown below:

COLUMN 19

Line 43, "13-19" should read --13-17--.

COLUMN 20

Figure 19:
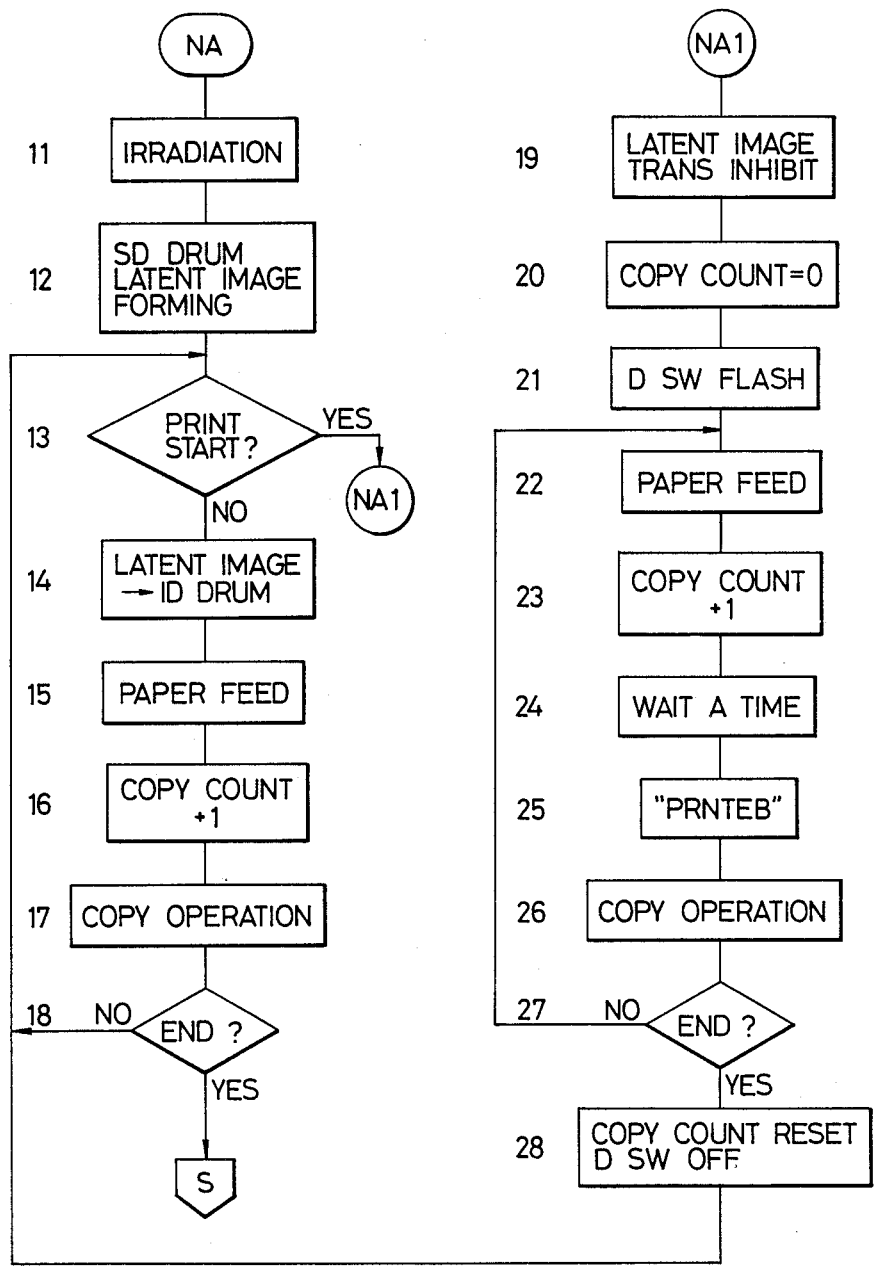

Line 17, "FIG. 16" should read --FIG. 19--.

COLUMN 23

Line 7, "enble" should read --enable--.
Line 46, "thrugh" should read --through--.

COLUMN 25

Line 22, "copy" should read --copying--.

COLUMN 28

Line 34, "clasim" should read --claim--.

Signed and Sealed this

Eleventh Day of June, 1991

*Attest:*

HARRY F. MANBECK, JR.

*Attesting Officer*   *Commissioner of Patents and Trademarks*